(12) United States Patent
Krishan et al.

(10) Patent No.: US 11,283,883 B1
(45) Date of Patent: Mar. 22, 2022

(54) METHODS, SYSTEMS, AND COMPUTER READABLE MEDIA FOR PROVIDING OPTIMIZED BINDING SUPPORT FUNCTION (BSF) PACKET DATA UNIT (PDU) SESSION BINDING DISCOVERY RESPONSES

(71) Applicant: Oracle International Corporation, Redwood Shores, CA (US)

(72) Inventors: Rajiv Krishan, Bangalore (IN); Raghuvamshi vasudev Singh Thakur, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/093,016

(22) Filed: Nov. 9, 2020

(51) Int. Cl.
*H04L 29/08* (2006.01)
*H04L 67/51* (2022.01)
(Continued)

(52) U.S. Cl.
CPC ............. *H04L 67/16* (2013.01); *H04L 67/02* (2013.01); *H04L 67/14* (2013.01); *H04W 4/50* (2018.02); *H04W 4/80* (2018.02); *H04W 28/08* (2013.01)

(58) Field of Classification Search
None
See application file for complete search history.

(56) References Cited

U.S. PATENT DOCUMENTS

| 1,872,857 A | 4/1931 | Wesson et al. |
| 5,878,347 A | 3/1999 | Joensuu et al. |

(Continued)

FOREIGN PATENT DOCUMENTS

| CN | 1809072 A | 7/2006 |
| CN | 101001440 A | 7/2007 |

(Continued)

OTHER PUBLICATIONS

"3rd Generation Partnership Project; Technical Specification Group Core Network and Terminals; 5G System; Binding Support Management Service; Stage 3 (Release 16)," 3GPP TS 29.521, V16.5.0, pp. 1-34 (Sep. 2020).

(Continued)

*Primary Examiner* — Lashonda T Jacobs
(74) *Attorney, Agent, or Firm* — Jenkins, Wilson, Taylor & Hunt, P.A.

(57) ABSTRACT

A method for providing optimized BSF PDU session binding discovery response includes maintain a PDU session binding database, subscribing with an NRF to receive notification of changes to NF profiles of PCF instances or NF sets identified in the PDU session binding records, and obtaining, from the NRF, lists of NF profiles for the PCF instances in the NF sets identified in the PDU session binding records. The method further includes receiving, from the NRF and in response to the subscription, at least one notification of changes in at least some of the NF profiles in the NF sets identified in the PDU session binding records. The method further includes receiving a PDU session binding discovery request from a consumer NF and responding to the PDU session binding discovery request using the PDU session binding records, the lists of NF profiles obtained from the NRF, and the notifications of changes in at least some of the NF profiles.

20 Claims, 10 Drawing Sheets

(51) Int. Cl.
*H04W 4/50* (2018.01)
*H04L 67/02* (2022.01)
*H04W 28/08* (2009.01)
*H04L 67/14* (2022.01)
*H04W 4/80* (2018.01)

(56) References Cited

U.S. PATENT DOCUMENTS

| | | |
|---|---|---|
| 6,006,098 A | 12/1999 | Rathnasabapathy et al. |
| 6,836,477 B1 | 12/2004 | West, Jr. et al. |
| 6,928,383 B2 | 8/2005 | Fukushima et al. |
| 6,967,956 B1 | 11/2005 | Tinsley et al. |
| 7,292,592 B2 | 11/2007 | Rune |
| 7,310,307 B1 | 12/2007 | Das et al. |
| 7,319,857 B2 | 1/2008 | Baldwin et al. |
| 7,551,926 B2 | 6/2009 | Rune |
| 7,738,488 B2 | 6/2010 | Marsico et al. |
| 7,792,981 B2 | 9/2010 | Taylor |
| 7,814,015 B2 | 10/2010 | Benedyk et al. |
| 7,844,745 B1 | 11/2010 | Darbyshire et al. |
| 7,916,685 B2 | 3/2011 | Schaedler et al. |
| 7,996,541 B2 | 8/2011 | Marathe et al. |
| 8,015,293 B2 | 9/2011 | Schaedler et al. |
| 8,125,999 B2 | 2/2012 | Yasrebi et al. |
| 8,532,110 B2 | 9/2013 | McCann et al. |
| 8,547,908 B2 | 10/2013 | Marsico |
| 8,615,237 B2 | 12/2013 | Baniel et al. |
| 8,737,304 B2 | 5/2014 | Karuturi et al. |
| 8,825,060 B2 | 9/2014 | McCann et al. |
| 8,831,076 B2 | 9/2014 | Yen |
| 8,903,357 B2 * | 12/2014 | Cutler .................. H04L 12/1407 455/406 |
| 8,918,469 B2 | 12/2014 | Sprague et al. |
| 8,942,747 B2 | 1/2015 | Marsico |
| 9,059,948 B2 | 6/2015 | Schaedler et al. |
| 9,148,524 B2 | 9/2015 | Deo |
| 9,288,169 B2 | 3/2016 | Schaedler et al. |
| 9,319,378 B2 | 4/2016 | McCann |
| 9,398,470 B2 | 7/2016 | Roeland et al. |
| 9,668,134 B2 | 5/2017 | McCann |
| 9,668,135 B2 | 5/2017 | McCann |
| 9,918,229 B2 | 3/2018 | McCann |
| 9,923,984 B2 | 3/2018 | McCann et al. |
| 9,930,528 B2 | 3/2018 | McCann |
| 10,084,755 B2 | 9/2018 | McCann |
| 10,554,661 B2 | 2/2020 | McCann |
| 10,951,519 B2 | 3/2021 | Renzullo et al. |
| 2001/0028636 A1 | 10/2001 | Skog et al. |
| 2002/0147845 A1 | 10/2002 | Sanchez-Herrero |
| 2002/0194378 A1 | 12/2002 | Foti |
| 2002/0196775 A1 | 12/2002 | Tuohino et al. |
| 2003/0040280 A1 | 2/2003 | Koskelainen |
| 2003/0131151 A1 | 7/2003 | Roach et al. |
| 2004/0098612 A1 | 5/2004 | Lee et al. |
| 2004/0103157 A1 | 5/2004 | Requena et al. |
| 2004/0152469 A1 | 8/2004 | Yla-Outinen et al. |
| 2004/0205212 A1 | 10/2004 | Huotari et al. |
| 2004/0223489 A1 | 11/2004 | Rotsten et al. |
| 2004/0225878 A1 | 11/2004 | Costa-Requena et al. |
| 2004/0242227 A1 | 12/2004 | Huotari et al. |
| 2004/0246965 A1 | 12/2004 | Westman et al. |
| 2004/0260816 A1 | 12/2004 | Skog et al. |
| 2005/0007984 A1 | 1/2005 | Shaheen et al. |
| 2005/0009520 A1 | 1/2005 | Herrero et al. |
| 2005/0058125 A1 | 3/2005 | Mutikainen et al. |
| 2005/0078642 A1 | 4/2005 | Mayer et al. |
| 2005/0094594 A1 | 5/2005 | Roh |
| 2005/0120198 A1 | 6/2005 | Bajko et al. |
| 2005/0124341 A1 | 6/2005 | Myllymaki et al. |
| 2005/0136926 A1 | 6/2005 | Tammi et al. |
| 2005/0155036 A1 | 7/2005 | Tiainen et al. |
| 2005/0159156 A1 | 7/2005 | Bajko et al. |
| 2005/0227675 A1 | 10/2005 | Lim et al. |
| 2005/0235000 A1 | 10/2005 | Keil |
| 2006/0002308 A1 | 1/2006 | Na et al. |
| 2006/0030320 A1 | 2/2006 | Tammi et al. |
| 2006/0045249 A1 | 3/2006 | Li et al. |
| 2006/0068762 A1 | 3/2006 | Baldwin et al. |
| 2006/0068816 A1 | 3/2006 | Pelaez et al. |
| 2006/0077926 A1 | 4/2006 | Rune |
| 2006/0078119 A1 | 4/2006 | Jee et al. |
| 2006/0136557 A1 | 6/2006 | Schaedler et al. |
| 2006/0161512 A1 | 7/2006 | Schaedler et al. |
| 2006/0172730 A1 | 8/2006 | Matsuda |
| 2006/0221972 A1 | 10/2006 | Bhargava et al. |
| 2006/0259759 A1 | 11/2006 | Maino et al. |
| 2006/0274744 A1 | 12/2006 | Nagai et al. |
| 2007/0121596 A1 | 5/2007 | Kurapati et al. |
| 2007/0136590 A1 | 6/2007 | Nah et al. |
| 2007/0153995 A1 | 7/2007 | Fang et al. |
| 2007/0189215 A1 | 8/2007 | Wu et al. |
| 2007/0242637 A1 | 10/2007 | Dynarski et al. |
| 2007/0297419 A1 | 12/2007 | Askerup et al. |
| 2008/0002652 A1 | 1/2008 | Gupta et al. |
| 2008/0039104 A1 | 2/2008 | Gu et al. |
| 2008/0256251 A1 | 10/2008 | Huotari et al. |
| 2009/0080440 A1 | 3/2009 | Balyan et al. |
| 2009/0089435 A1 | 4/2009 | Terrill et al. |
| 2009/0129271 A1 | 5/2009 | Ramankutty et al. |
| 2009/0156213 A1 | 7/2009 | Spinelli et al. |
| 2009/0177796 A1 | 7/2009 | Falk et al. |
| 2009/0196231 A1 | 8/2009 | Giaretta et al. |
| 2009/0196290 A1 | 8/2009 | Zhao et al. |
| 2009/0022131 A1 | 9/2009 | Chen et al. |
| 2009/0232011 A1 | 9/2009 | Li et al. |
| 2009/0264097 A1 | 10/2009 | Cai et al. |
| 2009/0265467 A1 | 10/2009 | Peles |
| 2009/0305684 A1 | 12/2009 | Jones et al. |
| 2009/0313379 A1 | 12/2009 | Rydnell et al. |
| 2010/0268814 A1 | 10/2010 | Cross et al. |
| 2010/0290392 A1 | 11/2010 | Rasanen et al. |
| 2010/0291923 A1 | 11/2010 | Zhou et al. |
| 2010/0299451 A1 | 11/2010 | Yigang et al. |
| 2010/0311392 A1 | 12/2010 | Stenfelt et al. |
| 2010/0331023 A1 | 12/2010 | Cai et al. |
| 2011/0040845 A1 | 2/2011 | Cai et al. |
| 2011/0116378 A1 | 5/2011 | Ramankutty et al. |
| 2011/0116382 A1 | 5/2011 | McCann et al. |
| 2011/0154454 A1 | 6/2011 | Frelechoux |
| 2011/0158090 A1 | 6/2011 | Riley et al. |
| 2011/0165901 A1 | 7/2011 | Baniel et al. |
| 2011/0199906 A1 | 8/2011 | Kanode et al. |
| 2011/0200053 A1 | 8/2011 | Kanode et al. |
| 2011/0202612 A1 | 8/2011 | Craig et al. |
| 2011/0202614 A1 | 8/2011 | Craig et al. |
| 2011/0202676 A1 | 8/2011 | Craig et al. |
| 2011/0211574 A1 | 9/2011 | Li et al. |
| 2011/0225113 A1 | 9/2011 | Mann |
| 2011/0225280 A1 | 9/2011 | Delsesto et al. |
| 2011/0225281 A1 | 9/2011 | Riley et al. |
| 2011/0225306 A1 | 9/2011 | Delsesto et al. |
| 2011/0282904 A1 | 11/2011 | Schaedler et al. |
| 2011/0302244 A1 | 12/2011 | McCann et al. |
| 2011/0314178 A1 | 12/2011 | Kanode et al. |
| 2012/0089993 A1 | 4/2012 | Alonso Alarcon et al. |
| 2012/0096177 A1 | 4/2012 | Rasanen |
| 2012/0124220 A1 | 5/2012 | Zhou et al. |
| 2012/0129488 A1 | 5/2012 | Patterson et al. |
| 2012/0155389 A1 | 6/2012 | McNamee et al. |
| 2012/0155470 A1 | 6/2012 | McNamee et al. |
| 2012/0177028 A1 | 7/2012 | Mo et al. |
| 2012/0201203 A1 | 8/2012 | Miyagawa et al. |
| 2012/0202550 A1 | 8/2012 | Marsico |
| 2012/0207015 A1 | 8/2012 | Marsico |
| 2012/0224524 A1 | 9/2012 | Marsico |
| 2012/0224531 A1 | 9/2012 | Karuturi et al. |
| 2012/0225679 A1 | 9/2012 | McCann et al. |
| 2012/0226758 A1 | 9/2012 | Sprague et al. |
| 2012/0226814 A1 | 9/2012 | Stucker |
| 2012/0236871 A1 | 9/2012 | Wallace et al. |
| 2012/0239771 A1 | 9/2012 | Rasanen |
| 2012/0265888 A1 | 10/2012 | Roeland et al. |
| 2012/0311064 A1 | 12/2012 | Deo |
| 2013/0171990 A1 | 7/2013 | McCann et al. |

(56) References Cited

U.S. PATENT DOCUMENTS

| | | |
|---|---|---|
| 2013/0246639 A1 | 9/2013 | Nedbal et al. |
| 2013/0279497 A1 | 10/2013 | Verma et al. |
| 2013/0304843 A1 | 11/2013 | Chow et al. |
| 2013/0311672 A1 | 11/2013 | Chastain |
| 2014/0092899 A1 | 4/2014 | Krishna et al. |
| 2014/0164633 A1* | 6/2014 | Bi .................. H04L 65/1069 709/227 |
| 2014/0207941 A1 | 7/2014 | McCann |
| 2014/0258423 A1 | 9/2014 | Schaedler et al. |
| 2014/0321278 A1 | 10/2014 | Cafarelli et al. |
| 2014/0342690 A1 | 11/2014 | Tanouchev et al. |
| 2014/0355523 A1 | 12/2014 | Congdon et al. |
| 2015/0036486 A1 | 2/2015 | McMurry et al. |
| 2015/0117420 A1 | 4/2015 | Raman et al. |
| 2015/0149656 A1 | 5/2015 | McMurry et al. |
| 2016/0373348 A1 | 12/2016 | Renzullo et al. |
| 2017/0048190 A1 | 2/2017 | McCann |
| 2017/0048202 A1 | 2/2017 | McCann |
| 2017/0048703 A1 | 2/2017 | McCann |
| 2017/0048704 A1 | 2/2017 | McCann |
| 2017/0126522 A1 | 5/2017 | McCann et al. |
| 2017/0141959 A1* | 5/2017 | Gilmore .............. H04L 65/1016 |
| 2017/0238178 A1 | 8/2017 | McCann |
| 2017/0238179 A1 | 8/2017 | McCann |
| 2019/0053308 A1* | 2/2019 | Castellanos Zamora ..... H04L 65/1073 |
| 2019/0313468 A1* | 10/2019 | Talebi Fard .......... H04W 60/04 |
| 2019/0357301 A1* | 11/2019 | Li ....................... H04M 15/66 |
| 2019/0394833 A1* | 12/2019 | Talebi Fard .......... H04W 60/00 |
| 2021/0037375 A1* | 2/2021 | Cakulev ............. H04L 12/1407 |
| 2021/0083965 A1* | 3/2021 | Taft .................... H04L 45/20 |
| 2021/0227625 A1* | 7/2021 | Wang .................. H04W 76/11 |
| 2021/0250411 A1* | 8/2021 | Cakulev .................. G06F 8/71 |

FOREIGN PATENT DOCUMENTS

| | | |
|---|---|---|
| CN | 101079742 A | 11/2007 |
| CN | 101247321 A | 8/2008 |
| CN | 101277541 A | 10/2008 |
| CN | 101483826 A | 7/2009 |
| CN | 101867873 A | 10/2010 |
| CN | 101945047 A | 1/2011 |
| CN | 102239481 A | 11/2011 |
| CN | 102656845 A | 9/2012 |
| CN | ZL201080065174.6 | 6/2015 |
| CN | 100037 | 7/2016 |
| CN | 103477661 B | 10/2016 |
| CN | ZL201280019607.3 | 12/2016 |
| CN | ZL201280013938.6 | 3/2017 |
| CN | ZL201280018298.8 | 3/2017 |
| CN | ZL201280018288.4 | 4/2017 |
| CN | ZL201480005758.2 | 7/2019 |
| EP | 1 357 720 A1 | 10/2003 |
| EP | 1 630 999 A1 | 3/2006 |
| EP | 2 107 725 A1 | 10/2009 |
| EP | 2 234 422 A1 | 9/2010 |
| EP | 2 242 205 A1 | 10/2010 |
| EP | 2 220 841 B1 | 9/2011 |
| EP | 1 846 832 B1 | 4/2012 |
| EP | 2 466 828 A1 | 6/2012 |
| EP | 2 522 103 A2 | 11/2012 |
| EP | 2 577 930 A2 | 4/2013 |
| EP | 2 681 940 B1 | 5/2016 |
| EP | 2 681 939 B1 | 9/2016 |
| EP | 2 522 102 B1 | 11/2016 |
| EP | 2 681 938 B1 | 12/2016 |
| EP | 2 671 396 B1 | 7/2019 |
| EP | 2 681 937 B1 | 9/2019 |
| EP | 2 949 109 B1 | 10/2019 |
| IN | 319441 | 8/2019 |
| IN | 360160 | 3/2021 |
| JP | H10-98470 A | 4/1998 |
| JP | H11-224219 A | 8/1999 |
| JP | 2004-242326 A | 8/2004 |
| JP | 2006-513631 | 4/2006 |
| JP | 4041038 B2 | 1/2008 |
| JP | 2009-537102 | 10/2009 |
| JP | 2010-527520 | 8/2010 |
| JP | 2010-0278884 A | 12/2010 |
| JP | 2013-527999 T | 7/2013 |
| JP | 5732550 B2 | 6/2015 |
| JP | 5758508 B2 | 8/2015 |
| JP | 5759064 B2 | 8/2015 |
| JP | 5938052 B2 | 6/2016 |
| JP | 5950943 B2 | 7/2016 |
| JP | 6091657 B2 | 2/2017 |
| WO | WO 2004/064442 A1 | 7/2004 |
| WO | WO 2006/066149 A2 | 6/2006 |
| WO | WO 2009/058067 A1 | 5/2009 |
| WO | WO 2009/070179 A1 | 6/2009 |
| WO | WO 2009/086759 A1 | 7/2009 |
| WO | WO 2010/139360 A1 | 12/2010 |
| WO | WO 2011/082035 A2 | 7/2011 |
| WO | WO 2011/082090 A2 | 7/2011 |
| WO | WO 2011/082895 A1 | 7/2011 |
| WO | WO 2011/156274 A2 | 12/2011 |
| WO | WO 2012/106710 A1 | 8/2012 |
| WO | WO 2012/118959 A1 | 9/2012 |
| WO | WO 2012/118963 A1 | 9/2012 |
| WO | WO 2012/118967 A1 | 9/2012 |
| WO | WO 2012/119147 A1 | 9/2012 |
| WO | WO 2012/154674 A2 | 11/2012 |
| WO | WO 2014/116464 A1 | 7/2014 |

OTHER PUBLICATIONS

"3rd Generation Partnership Project; Technical Specification Group Core Network and Terminals; 5G System; Network Function Repository Services; Stage 3 (Release 16)," 3GPP TS 29.510, V16.5.0, pp. 1-208 (Sep. 2020).

"3rd Generation Partnership Project; Technical Specification Group Services and System Aspects; Procedures for the 5G System (5GS); Stage 2 (Release 16)," 3GPP TS 23.502, V16.6.0, pp. 1-597 (Sep. 2020).

"3rd Generation Partnership Project; Technical Specification Group Services and System Aspects; Policy and charging control framework for the 5G System (5GS); Stage 2 (Release 16)," 3GPP TS 23.503, V16.6.0, pp. 1-118 (Sep. 2020).

"3GPP TSG-CT WG3 Meeting #109-e," 29.521 CR 0068, Rev 1, Current Version 16.3.0, pp. 1-13 (Apr. 2020).

"Oracle Communications Binding Support Function Cloud Native User's Guide Release 1.0," Oracle Communications, pp. 1-2 (2019).

Hearing Notice for Indian Patent Application Serial No. 6878/CHENP/2013 (Jan. 15, 2021).

Notice of Allowance and Fee(s) Due for U.S. Appl. No. 14/742,679 (dated Nov. 10, 2020).

Advisory Action Before the Filing of an Appeal Brief, Examiner-Initiated Interview Summary, and AFCP 2.0 Decision for U.S. Appl. No. 14/742,679 (dated Aug. 11, 2020).

Final Office Action for U.S. Appl. No. 14/742,679 (dated Apr. 29, 2020).

Applicant-Initiated Interview Summary for U.S. Appl. No. 14/742,679 (dated Feb. 3, 2020).

Non-Final Office Action for U.S. Appl. No. 14/742,679 (dated Nov. 4, 2019).

First Examination Report for Indian Patent Application Serial No. 3931/CHENP/2015 (dated Oct. 21, 2019).

Decision to grant a European patent pursuant to Article 97(1) EPC for European Patent Application Serial No. 14702996.1 (dated Sep. 19, 2019).

Notice of Allowance and Fee(s) Due for U.S. Appl. No. 14/826,289 (dated Sep. 13, 2019).

Decision to grant a European patent pursuant to Article 97(1) EPC for European Patent Application Serial No. 12751783.7 (dated Aug. 29, 2019).

Decision to grant a European patent pursuant to Article 97(1) EPC for European Patent Application Serial No. 12741984.4 (dated Jun. 27, 2019).

(56) References Cited

OTHER PUBLICATIONS

Letter Regarding Notification to Grant of Chinese Patent Application Serial No. 201480005758.2 (dated Jun. 6, 2019).
Non-Final Office Action for U.S. Appl. No. 14/826,289 (dated May 16, 2019).
Communication under Rule 71(3) EPC of Intention to Grant for European Patent Application Serial No. 14 702 996.1 (dated May 10, 2019).
Communication under Rule 71(3) EPC for European Patent Application Serial No. 12 751 783.7 (dated Apr. 24, 2019).
Office Action for Indian Patent Application Serial No. 8612/CHENP/2013 (dated Apr. 23, 2019).
Advisory Action Before the Filing of an Appeal Brief for U.S. Appl. No. 14/742,679 (dated Apr. 17, 2019).
Hearing Notice for Indian Patent Application Serial No. 6547/CHENP/2012 (Mar. 25, 2019).
Notification of the Third Office Action for Chinese Patent Application Serial No. 201480005758.2 (dated Mar. 4, 2019).
Communication under Rule 71(3) EPC for European Patent Application Serial No. 12 741 984.4 (dated Feb. 12, 2019).
Advisory Action, Examiner-Initiated Interview Summary, and AFCP 2.0 Decision for U.S. Appl. No. 14/826,289 (dated Feb. 1, 2019).
Final Office Action for U.S. Appl. No. 14/742,679 (dated Jan. 28, 2019).
Communication pursuant to Article 94(3) EPC for European Patent Application Serial No. 14 702 996.1 (dated Nov. 29, 2018).
Final Office Action for U.S. Appl. No. 14/826,289 (dated Nov. 2, 2018).
First Examination Report for Indian Patent Application No. 6878/CHENP/2013 (dated Sep. 27, 2018).
Notification of the Second Office Action for Chinese Patent Application No. 201480005758.2 (dated Sep. 27, 2018).
First Examination Report for Indian Patent Application No. 6547/CHENP/2012 (dated Sep. 10, 2018).
Non-Final Office Action for U.S. Appl. No. 14/742,679 (dated Jun. 12, 2018).
Notice of Allowance and Fee(s) Due and Applicant-Initiated Interview Summary for U.S. Appl. No. 14/929,283 (dated May 23, 2018).
Advisory Action for U.S. Appl. No. 14/929,283 (dated Apr. 12, 2018).
Non-Final Office Action for U.S. Appl. No. 14/826,289 (dated Apr. 5, 2018).
Final Office Action for U.S. Appl. No. 14/929,283 (dated Feb. 22, 2018).
Advisory Action for U.S. Appl. No. 14/826,289 (dated Feb. 5, 2018).
Notification of the First Office Action for Chinese Patent Application No. 201480005758.2 (dated Jan. 2, 2018).
Final Office Action for U.S. Appl. No. 14/826,289 (dated Nov. 3, 2017).
Notice of Allowance and Fee(s) Due and Applicant-Initiated Interview Summary for U.S. Appl. No. 14/928,660 (dated Nov. 2, 2017).
Notice of Allowance and Fee(s) Due and Applicant-Initiated Interview Summary for U.S. Appl. No. 15/582,591 (dated Nov. 1, 2017).
Notice of Allowance and Fee(s) Due and Applicant-Initiated Interview Summary for U.S. Appl. No. 15/582,503 (dated Oct. 26, 2017).
Advisory Action, Examiner-Initiated Interview Summary, and AFCP 2.0 Decision for U.S. Appl. No. 14/742,679 (dated Sep. 22, 2017).
Non-Final Office Action for U.S. Appl. No. 14/929,283 (dated Aug. 30, 2017).
Applicant Initiated Interview Summary for U.S. Appl. No. 14/826,289 (dated Jul. 27, 2017).
Non-Final Office Action for U.S. Appl. No. 14/928,660 (dated Jul. 21, 2017).
Non-Final Office Action for U.S. Appl. No. 15/582,503 (dated Jun. 30, 2017).
Non-Final Office Action for U.S. Appl. No. 15/582,591 (dated Jun. 30, 2017).
Final Office Action for U.S. Appl. No. 14/742,679 (dated Jun. 30, 2017).
Non-Final Office Action for U.S. Appl. No. 14/826,289 (dated May 1, 2017).
Commonly-assigned U.S. Appl. No. 15/582,591 for "Methods, Systems, and Computer Readable Media for Providing Access Network Protocol Interworking and Authentication Proxying," (filed Apr. 28, 2017).
Communication pursuant to Article 94(3) EPC for European Application No. 12 751 783.7 (dated Mar. 15, 2017).
Notice of Allowance and Fee(s) Due for U.S. Appl. No. 14/827,015 (dated Mar. 10, 2017).
Letter Regarding Decision to Grant for Chinese Application No. ZL201280018288.4 (dated Feb. 14, 2017).
Letter Regarding Decision to Grant for Chinese Application No. ZL201280013938.6 (dated Feb. 3, 2017).
Non-Final Office Action for U.S. Appl. No. 14/742,679 (dated Feb. 2, 2017).
Letter Regarding Notice of Grant for Japanese Patent Application No. 2015-553784 (dated Jan. 24, 2017).
Notice of Allowance and Fee(s) Due for U.S. Appl. No. 14/827,025 (dated Jan. 20, 2017).
Letter Regarding Decision to Grant for Chinese Patent Application No. ZL201280018298.8 (dated Jan. 10, 2017).
Extended European Search Report for European Patent Application No. 12741984.4 (dated Dec. 20, 2016).
Applicant-Initiated Interview Summary for U.S. Appl. No. 14/827,025 (dated Dec. 13, 2016).
Decision to grant a European patent pursuant to Article 97(1) EPC for European Patent Application No. 12751812.4 (dated Nov. 24, 2016).
Non-Final Office Action for U.S. Appl. No. 14/827,015 (dated Oct. 31, 2016).
Decision to grant a European patent pursuant to Article 97(1) EPC for European Patent Application No. 10841605.8 (dated Oct. 27, 2016).
Letter Regarding Decision to Grant a Chinese Patent for Chinese Patent Appication No. ZL201280019607.3 (dated Oct. 10, 2016).
Notification of the Second Office Action for Chinese Patent Application No. 201280013938.6 (dated Oct. 9, 2016).
Notification of the Second Office Action for Chinese Patent Application No. 201280018288.4 (dated Sep. 5, 2016).
Communication under Rule 71(3) EPC for European Patent Application No. 12 751 812.4 (dated Sep. 2, 2016).
Non-Final Office Action for U.S. Appl. No. 14/827,025 (dated Aug. 26, 2016).
Decision to grant a European patent pursuant to Article 97(1) EPC for European Patent Applicaton No. 12751986.6 (dated Aug. 19, 2016).
Intent to Grant for European Patent Application No. 10841605.8 (dated Aug. 12, 2016).
Letter Regarding Office Action for Japanese Patent Application No. 2015-553784 (dated Jul. 19, 2016).
Letter Regarding Notice of Grant for Chinese Patent Application No. ZL201280018297.3 (dated Jul. 4, 2016).
Communication under Rule 71(3) EPC for European Application No. 12 751 986.6 (dated Jun. 8, 2016).
Letter Regarding Notice of grant for Japanese Patent Application No. 2013-552714 (dated May 31, 2016).
Decision to grant a European patent pursuant to Article 97(1) EPC for European Application No. 12752952.7 (dated Apr. 29, 2016).
Official Notice of Grant for Japanese Patent Application No. 2013-556860 (dated Apr. 26, 2016).
Notification of the First Office Action for Chinese Patent Application No. 201280018298.8 (dated Mar. 3, 2016).
Communication pursuant to Article 94(3) EPC for European Patent Application No. 10841605.8 (dated Feb. 22, 2016).
Communication under Rule 71(3) EPC for European Patent Application No. 12752952.7 (dated Feb. 10, 2016).
Letter Regarding Notice of Grant for Japanese Patent Application No. 2013-556855 (dated Feb. 2, 2016).
Notification of the First Office Action for Chinese Application No. 201280019607.3 (dated Feb. 1, 2016).

(56) References Cited

OTHER PUBLICATIONS

Notification of the First Office Action for Chinese Application No. 201280013938.6 (dated Jan. 27, 2016).
Notification of the First Office Action for Chinese Application No. 201280018297.3 (dated Jan. 15, 2016).
Notification of the First Office Action for Chinese Application No. 201280018288.4 (dated Dec. 29, 2015).
Communication pursuant to Article 94(3) EPC for European Application No. 12 751 986.6 (dated Dec. 22, 2015).
Notice of Allowance and Fee(s) Due for U.S. Appl. No. 13/748,547 (dated Dec. 11, 2015).
Letter Regarding Office Action for Japanese Patent Application No. 2013-552714 (dated Dec. 8, 2015).
Letter Regarding Final Rejection for Japanese Patent Application No. 2013-556860 (dated Nov. 17, 2015).
Communication of European publication number and information on the application of Article 67(3) EPC for European Application No. 14702996.1 (dated Nov. 4, 2015).
Commonly-assigned U.S. Appl. No. 14/929,283 for "Methods, Systems, and Computer Readable Media for Remote Access Dial in User Service (RADIUS) Proxy and Diameter Agent Address Resolution," (filed Oct. 31, 2015).
Commonly-assigned U.S. Appl. No. 14/928,660 for "Methods, Systems, and Computer Readable Media for Remote Authentication Dial in User Service (RADIUS) Message Loop Detection and Mitigation," (filed Oct. 30, 2015).
Notice of Allowance and Fee(s) Due and Applicant-Initiated Interview Summary for U.S. Appl. No. 14/190,071 (dated Oct. 30, 2015).
Advisory Action for U.S. Appl. No. 13/748,547 (dated Oct. 16, 2015).
Supplemental Notice of Allowability & Response to Rule 312 Communication for U.S. Appl. No. 13/465,552 (dated Aug. 27, 2015).
Commonly-Assigned, U.S. Appl. No. 14/826,289 for "Methods, Systems, and Computer Readable Media for Providing Access Network Session Correlation for Policy Control," (filed Aug. 14, 2015).
Commonly-assigned U.S. Appl. No. 14/827,015 for "Methods, Systems, and Computer Readable Media for Providing Access Network Protocol Interworking and Authentication Proxying," (filed Aug. 14, 2015).
Commonly-assignedU.S. Appl. No. 14/827,025 for "Methods, Systems, and Computer Readable Media for Providing Access Network Signaling Protocol Interworking for User Authentication," (filed Aug. 14, 2015).
Final Office Action for U.S. Appl. No. 13/748,547 (dated Aug. 10, 2015).
Letter Regarding Publication of Patent for Japanese Patent Application No. 2014-509509 (Aug. 5, 2015).
Letter Regarding Publication of Patent for Japanese Patent Application No. 2013-556857 (Aug. 5, 2015).
Letter Regarding Office Action for Japanese Patent Application No. 2013-556860 (dated Jul. 21, 2015).
Non-Final Office Action for U.S. Appl. No. 14/190,071 (dated Jul. 8, 2015).
Letter Regarding Publication of Patent for Japanese Patent Application No. 2013-556675 (Jun. 10, 2015).
Letter Regarding Notice of Grant for Japanese Patent Application No. 2014-509509 (dated Jun. 2, 2015).
Letter Regarding Notice of Grant for Japanese Patent Application No. 2013-556857 (dated May 26, 2015).
Notice of Allowance and Fee(s) Due and Examiner-Initiated Interview Summary for U.S. Appl. No. 13/465,552 (dated May 20, 2015).
Decision to Grant for Chinese Patent Application No. 201080065174.6 (dated Apr. 16, 2015).
Second Office Action for Japanese Patent Application No. 2013-556857 (dated Apr. 14, 2015).
Letter Regarding Notice of Grant for Japanese Patent Application No. 2013-556675 (dated Mar. 31, 2015).
Letter Regarding Office Action for Japanese Patent Application No. 2013-556855 (dated Feb. 24, 2015).
Notice of Allowance and Fee(s) Due and Examiner-Initiated Interview Summary for U.S. Appl. No. 13/192,410 (dated Feb. 12, 2015).
Applicant-Initiated Interview Summary for U.S. Appl. No. 13/465,552 (dated Feb. 9, 2015).
Notice of Panel Decision from Pre-Appeal Brief Review for U.S. Appl. No. 13/192,410 (dated Feb. 4, 2015).
Extended European Search Report for European Patent Application No. 12751986.6 (dated Jan. 20, 2015).
Non-Final Office Action for U.S. Appl. No. 13/748,547 (dated Jan. 5, 2015).
Supplemental Notice of Allowability for U.S. Appl. No. 13/366,928 (dated Dec. 26, 2014).
Non-Final Office Action for U.S. Appl. No. 13/465,552 (dated Oct. 17, 2014).
Letter Regarding Office Action for Japanese Patent Application No. 2013-556675 (dated Sep. 30, 2014).
Final Office Action for U.S. Appl. No. 13/192,410 (dated Sep. 25, 2014).
First Office Action for Japanese Application No. 2013-556857 (dated Sep. 24, 2014).
Notice of Allowance and Fee(s) Due for U.S. Appl. No. 13/366,928 (dated Sep. 3, 2014).
Extended European Search Report for European Application No. 12752952.7 (dated Aug. 27, 2014).
Notification of the First Office Action for Chinese Application No. 201080065174.6 (dated Aug. 13, 2014).
Extended European Search Report for European Application No. 12751783.7 (dated Jul. 22, 2014).
Extended European Search Report for European Application No. 12751812.4 (dated Jul. 16, 2014).
Notice of Allowance and Fee(s) Due for U.S. Appl. No. 13/409,893 (dated Jul. 10, 2014).
Notice of Allowance and Fee(s) Due for U.S. Appl. No. 13/409,914 (dated Apr. 25, 2014).
Supplemental Notice of Allowability for U.S. Appl. No. 13/409,949 (dated Apr. 24, 2014).
Notification of Transmittal of the International Search Report and the Written Opinion of the International Searching Authority, or the Declaration for International Patent Application No. PCT/US2014/011548 (dated Mar. 28, 2014).
Non-Final Office Action for U.S. Appl. No. 13/366,928 (dated Mar. 21, 2014).
Non-Final Office Action for U.S. Appl. No. 13/192,410 (dated Feb. 20, 2014).
Communication of European publication number and information on the application of Article 67(3) EPC for European Application No. 12781800.3 (dated Feb. 12, 2014).
Advisory Action Before the Filing of an Appeal Brief for U.S. Appl. No. 13/366,928 (dated Feb. 10, 2014).
Extended European Search Report for European Application No. 10841605.8 (dated Feb. 3, 2014).
Notice of Allowance and Fee(s) Due for U.S. Appl. No. 13/409,949 (dated Jan. 14, 2014).
Final Office Action for U.S. Appl. No. 13/409,914 (dated Dec. 30, 2013).
Notification of Publication and Entry into Examination Procedure for Chinese Patent Application No. 201280013938.6 (Dec. 18, 2013).
Communication of European publication number and information on the application of Article 67(3) EPC for European Application No. 12751986.6 (dated Dec. 11, 2013).
Communication of European publication number and information on the application of Article 67(3) EPC for European Application No. 12751783.7 (dated Dec. 11, 2013).
Communication of European publication number and information on the application of Article 67(3) EPC for European Application No. 12751812.4 (dated Dec. 11, 2013).
Communication of European publication number and information on the application of Article 67(3) EPC for European Application No. 12741984.4 (dated Nov. 13, 2013).

(56) References Cited

OTHER PUBLICATIONS

Declaration of Mark Kanode for U.S. Appl. No. 13/409,893, filed Nov. 1, 2013.
Advisory Action for U.S. Appl. No. 13/192,410 (dated Oct. 24, 2013).
Final Office Action for U.S. Appl. No. 13/366,928 (dated Oct. 23, 2013).
Applicant-Initiated Interview Summary for U.S. Appl. No. 13/192,410 (dated Oct. 18, 2013).
Final Office Action for U.S. Appl. No. 13/409,949 (dated Sep. 19, 2013).
Advisory Action Before the Filing of an Appeal Brief for U.S. Appl. No. 13/409,893 (dated Sep. 13, 2013).
Notice of Allowance and Fee(s) Due for U.S. Appl. No. 12/974,869 (dated Aug. 19, 2013).
Final Office Action for U.S. Appl. No. 13/192,410 (dated Aug. 5, 2013).
Final Office Action for U.S. Appl. No. 13/409,893 (dated Jul. 1, 2013).
Non-Final Office Action for U.S. Appl. No. 13/409,914 (dated Jun. 7, 2013).
Notice of Allowance and Fee(s) Due for U.S. Appl. No. 13/412,352 (dated May 28, 2013).
Non-Final Office Action for U.S. Appl. No. 13/366,928 (dated Mar. 26, 2013).
Non-Final Office Action for U.S. Appl. No. 13/409,949 (dated Feb. 15, 2013).
Notice of Allowance and Fee(s) Due for U.S. Appl. No. 13/366,928 (dated Jan. 7, 2013).
Non-Final Office Action for U.S. Appl. No. 13/192,410 (dated Dec. 20, 2012).
Non-Final Office Action for U.S. Appl. No. 13/409,893 (dated Dec. 13, 2012).
Non-Final Official Action for U.S. Appl. No. 12/409,914 (dated Nov. 6, 2012).
Notification of Transmittal of the International Search Report and the Written Opinion of the International Searching Authority, or the Declaration for International Patent Application No. PCT/US2012/036784 (dated Nov. 1, 2012).
Non-Final Official Action for U.S. Appl. No. 13/412,352 (dated Oct. 26, 2012).
Communication of European publication number and information on the application of Article 67(3) EPC for European Patent Application No. 10841605.8 (dated Oct. 17, 2012).
Fajardo et al., "Diameter Base Protocol," RFC 6733, pp. 1-152 (Oct. 2012).
Li et al., "MCC: A Message and Command Correlation Method for Identifying New Interactive Protocols via Session Analysis," Tsinghua Science and Technology, vol. 17, No. 3, pp. 1-10 (Jun. 2012).
Notification of Transmital of the International Search Report and the Written Opinion of the International Searching Authority, or the Declaration for International Patent Application No. PCT/US2012/027281 (dated Jun. 15, 2012).
Notification of Transmittal of the International Search Report and the Written Opinion of the International Searching Authority, or the Declaration for International Application No. PCT/US2012/027263 (dated Jun. 14, 2012).
Notification of Transmittal of the International Search Report and the Written Opinion of the International Searching Authority, or the Declaration for International Patent Application No. PCT/US2012/027736 (dated Jun. 12, 2012).
Notification of Transmittal of the International Search Report and the Written Opinion of the International Searching Authority, or the Declaration for International Patent Application No. PCT/US2012/023971 (dated Jun. 11, 2012).
Notification of Transmittal of the International Search Report and the Written Opinion of the International Searching Authority, or the Declaration for International Patent Application No. PCT/US2012/027269 (dated Jun. 11, 2012).

"Multi-Protocol Routing Agent User's Guide," 910-6404-001 Revision A, Policy Management, Tekelec, pp. 1-70 (Jun. 2012).
Decision to grant a European patent pursuant to Article 97(1) EPC for European Application No. 05854512.0 (dated Mar. 15, 2012).
Communication under Rule 71(3) EPC for European application No. 05854512.0 (dated Nov. 11, 2011).
Notification of the Transmittal of the International Search Report and the Written Opinion of the International Searching Authority, or the Declaration for International Application No. PCT/US2010/061934 (dated Oct. 25, 2011).
Notice of Allowance and Fee(s) Due for U.S. Appl. No. 11/303,757 (dated May 11, 2011).
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 10)," 3GPP TS 29.272, V10.2.0, pp. 1-95 (Mar. 2011).
3GPP, "3rd Generation Partnership Project; Technical Specification Group Services and System Aspects; Policy and Charging Control Architecture (Release 11)," 3GPP TS 23.203 V11.0.1, pp. 1-137 (Jan. 2011).
"Traffix Signaling Delivery Controller—One Platform to Deliver the Wonders of 4G," Traffix Systems, The Diameter Control Plane Experts, pp. 1-7 (2011).
"Traffix Signaling Delivery Controller (SDC)," Traffix Systems, The Diameter Control Plane Experts, pp. 1-5 (2011).
"Traffix Signaling Delivery Controller (SDC) Diameter Gateway—Use Case Development Scenarios," Traffix Systems, The Diameter Control Plane Experts, www.traffixsystems.com pp. 1-4 (2011).
"Traffix Signaling Delivery Controller Diameter Load Balancer: Scalability for your Control Plane," Traffix Systems, The Diameter Control Plane Experts, www.traffixsystems.com pp. 1-3 (2011).
Official Action for U.S. Appl. No. 11/303,757 (dated Dec. 22, 2010).
3GPP, "3rd Generation Partnership Project; Technical Specification Group Core Network and Terminals; Sh Interface based on the Diameter protocol; Protocol details (Release 8)," 3GPP TS 29.329, V8.8.0, pp. 1-20 (Dec. 2010).
Communication pursuant to Article 94(3) EPC for European Application No. 05 854 512.0 (dated Oct. 12, 2010).
"Digital cellular telecommunications system (Phase 2+); Universal Mobile Telecommunications System (UMTS); LTE; IP Multimedia Subsystem (IMS); Stage 2 (3GPP TS 23.228 version 9.4.0 Release 9)," ETSI TS 123 228, V9.4.0, pp. 1-130 (Oct. 2010).
"Digital cellular telecommunications system (Phase 2+); Universal Mobile Telecommunications System (UMTS); LTE; End-to-end Quality of Service (QoS) concept and architecture (3GPP TS 23.207 version 9.0.0 Release 9)," ETSI TS 123 207, V9.0.0, pp. 1-40 (Oct. 2010).
"3rd Generation Partnership Project; Technical Specification Group Services and System Aspects; Telecommunication management; Charging management; Packet Switched (PS) domain charging (Release 9)," 3GPP TS 32.251, V9.4.0, pp. 1-76 (Oct. 2010).
"3rd Generation Partnership Project; Technical Specification Group Services and System Aspects; Telecommunication management; Charging management; Diameter charging applications (Release 9)," 3GPP TS 32.299, V9.4.0, pp. 1-148 (Jun. 2010).
"3rd Generation Partnership Project; Technical Specification Group Services and System Aspects; Telecommunication management; Charging management; Charging architecture and principles (Release 9)," 3GPP TS 32.240, V9.1.0, pp. 1-44 (Jun. 2010).
Znaty, "Diameter, GPRS, (LTE+ePC=EPS), IMS, PCC and SDM," EFORT, pp. 1-229 (Part 1 of 2) (May 2010).
Znaty, "Diameter, GPRS, (LTE+ePC=EPS), IMS, PCC and SDM," EFORT pp. 230-461 (Part 2 of 2) (May 2010).
3GPP, "3rd Generation Partnership Project; Technical Specification Group Core Network and Terminals; Policy and Charging Control signalling flows and Quality of Service (QoS) parameter mapping (Release 9)," 3rd Generation Partnership Project, TS 29.213 V9.2.0, pp. 1-129 (Mar. 2010).
"3rd Generation Partnership Project; Technical Specification Group Core Network and Terminals; Policy and Charging Control over Gx reference point (Release 9)," 3GPP TS 29.212 V9.2.0, pp. 1-11 (Mar. 2010).

(56) References Cited

OTHER PUBLICATIONS

Communication pursuant to Article 94(3) EPC for European Application No. 05854512.0 (dated Feb. 8, 2010).
Final Official Action for U.S. Appl. No. 11/303,757 (dated Dec. 9, 2009).
"3rd Generation Partnership Project; Technical Specification Group Services and System Aspects; Policy and charging control architecture (Release 9)," 3GPP TS 23.203, V9.3.0, pp. 1-123 (Dec. 2009).
Supplementary European Search Report for European Application No. 05854512.0 (dated Nov. 17, 2009).
Official Action for U.S. Appl. No. 11/303,757 (dated May 28, 2009).
"Cisco Content Services Gateway—2nd Generation Release 3.5 Installation and Configuration Guide," Chapter 10: Configuring Gx Support, pp. 10-1-10-10, Chapter 11: Configuring Mobile PCC Support, pp. 11-1-11-8, URL: http://www.cisco.com/en/US/docs/wireless/csg2/3.5/installation/guide/csg3-51.pdf (Jun. 5, 2009).
Gundavelli et al., "Network Mobility (NEMO) Management Information Base," RFC 5488, pp. 1-44 (Apr. 2009).
3GPP, "3rd Generation Partnership Project; Technical Specification Group Core Network and Terminals; IP Multimedia (IM) Subsystem Sh interface; Signalling flows and message contents (Release 8)," 3GPP TS 29.328 V8.4.0, pp. 1-42 (Mar. 2009).
Final Official Action for U.S. Appl. No. 11/303,757 (dated Oct. 6, 2008).
Official Action for U.S. Appl. No. 11/303,757 (dated May 7, 2008).
Notification of Transmittal of the International Search Report and the Written Opinion corresponding to International Application No. PCT/US05/45813 (dated Mar. 24, 2008).
Official Action for U.S. Appl. No. 11/303,757 (dated Feb. 21, 2008).
Chiba et al., "Dynamic Authorization Extensions to Remote Authentication Dial In User Service (RADIUS)," RFC 5176, pp. 1-32 (Jan. 2008).
Restriction Requirement for U.S. Appl. No. 11/303,757 (dated Oct. 4, 2007).
"Tekelec Announces TekCore IMS Core Platform," pp. 1-2 (Jun. 5, 2006).
"Operator Guidebook to IMS and New Generation Networks and Services," www.morianagroup.com, Second Edition, 480 pgs. (Feb. 2006).
Liu et al., "IBM Technical Library, Introduction to Diameter," pp. 1-9, http://www.ibm.com/developerworks/wireless/library/wi-diameter (Jan. 24, 2006).
Arkko et al., "Extensible Authentication Protocol Method for 3rd Generation Authentication and Key Agreement (EAP-AKA)," RFC 4187, pp. 1-79 (Jan. 2006).
Haverinen et al., "Extensible Authentication Protocol Method for Global System for Mobile Communications (GSM) Subscriber Identity Modules (EAP-SIM)," RFC 4186, pp. 1-80 (Jan. 2006).
Rouse, "Platform," http://searchservervirtualization.techtarget.com/definition/platform, pp. 1-2 (2006-2009).
Camarillo et al., "The 3G IP Multimedia Subsystem (IMS), Merging the Internet and the Cellular Worlds," Second Edition, pp. xvii-427 (2006).
Fathi et al., "On VoIP Session setup delay using SIP over correlated fading channels," IEEE 16th International Symposium on Personal, Indoor and Mobile Radio Communications, pp. 1-5 (2005).
Hakala et al., "Diameter Credit-Control Application," RFC 4006, pp. 1-114 (Aug. 2005).
Calhoun et al., "Diameter Network Access Server Application," RFC 4005, pp. 1-85 (Aug. 2005).
Calhoun et al., "Diameter Mobile IPv4 Application," RFC 4004, pp. 1-53 (Aug. 2005).
"Operator Guidebook to IMS and New Generation Networks and Services," www.morianagroup.com, First Edition, pp. 1-450 (Aug. 2005) (Part 1 of 2).
"Operator Guidebook to IMS and New Generation Networks and Services," www.morianagroup.com, First Edition, pp. 451-934 (Aug. 2005) (Part 2 of 2).
Gonzalo et al., "The 3G IP Multimedia Subsystem," Chapter 3: General Principles of the IMS Architecture, Chapter 5: Session Control in the IMS, pp. 29-39, 91-105 (Aug. 20, 2004).
"IP Multimedia Subsystem IMS Over and Applications," 3G Americas, pp. 1-17 (Jul. 2004).
Aboba et al., "Extensible Authentication Protocol (EAP)," RFC 3748, pp. 1-67 (Jun. 2004).
"3rd Generation Partnership Project; technical Specification Group Core Network; IP Multimedia (IM) Session Handling; IM Call Model; Stage 2 (Release 6)," 3GPP TS 23.218, V6.1.0, pp. 1-56 (Mar. 2004).
"IMS Security Framework," 3GPP2 S.R0086-0, Version 1.0, pp. 1-39 (Dec. 11, 2003).
"IP Multimedia Subsystem—Accounting Information Flows and Protocol," 3GPP2 X.S0013-008-0, Version 1.0, pp. 1-42 (Dec. 2003).
"IP Multimedia Subsystem—Charging Architecture," 3GPP2 X.S0013-007-0, Version 1.0, pp. 1-16 (Dec. 2003).
"All-IP Core Network Multimedia Domain," 3rd Generation Partnerships Project 2 (3GPP2), 3GPP2 X.S0013-000-0, Version 1.0, pp. i-ii and 1-14 (Dec. 2003).
"3rd Generation Partnership Project; Technical Specification Group Core Network; Cx and Dx Interfaces Based on the Diameter Protocol; Protocol Details (Release 5)," 3GPP TS 29.229, V5.6.0, pp. 1-23 (Dec. 2003).
Calhoun et al., "Diameter Base Protocol," RFC 3588, pp. 1-147 (Sep. 2003).
Aboba et al., "RADIUS (Remote Authentication Dial In User Service) Support For Extensible Authentication Protocol (EAP)," RFC 3579, pp. 1-46 (Sep. 2003).
"Digital Cellular Telecommunications System (Phase 2+); Universal Mobile Telecommunications System (UMTS); IP Multimedia Subsystem (IMS); Stage 2 (Release 5)," 3GPP TS 23.228, V5.7.0, pp. 1-130 (Dec. 2002).
Olson et al., "Support for IPv6 in Session Description Protocol (SDP)," RFC 3266, pp. 1-5 (Jun. 2002).
Rosenberg et al., "SIP: Session Initiation Protocol," RFC 3261, pp. 1-252 (Jun. 2002).
"ITP Operations Manual," Cisco Systems, Inc., pp. 1-320 (May 1, 2002).
Howard, "Sipping IETF51 3GPP Security and Authentication," http://www3.ietf.org/proceedings/01aug/slides/sipping-7/index.htm, 24 pgs. (Dowloaded from Internet on Dec. 16, 2005) (Sep. 13, 2001).
Calhoun et al., "Diameter Base Protocol," draft-ietf-aaa-diameter-07, Section 6.3, p. 68 (Jul. 2001).
Narten et al., "Privacy Extensions for Stateless Address Autoconfiguration in IPv6," RFC 3041, pp. 1-16 (Jan. 2001).
"Configuring ITP Optional Features," IP Transfer Point, Cisco Systems, Inc., pp. 29-76 (2001).
"Cisco IP Transfer Point Q & A," Cisco Systems, Inc., pp. 1-15 (1992-2001).
Faltstrom, "E.164 Number and DNS," RFC 2916, pp. 1-10 (Sep. 2000).
Rigney et al., "RADIUS Accounting," RFC 2866, pp. 1-26 (Jun. 2000).
Rigney et al., "Remote Authentication Dial In User Service (RADIUS)," RFC 2865, pp. 1-70 (Jun. 2000).
Vaha-Sipila, "URLs for Telephone Calls," RFC 2806, pp. 1-20 (Apr. 2000).
Aboba et al., "The Network Access Identifier," RFC 2486, pp. 1-8 (Jan. 1999).
Calhoun et al., "Diameter Proxy Server Extensions," IETF Working Draft, draft-calhoun-diameter-proxy-01.txt, pp. 1-21 (Aug. 1, 1998).
Berners-Lee et al., "Uniform Resource Identifiers (URI): Generic Syntax," RFC 2396, pp. 1-38 (Aug. 1998).
Tekelec, "Eagle® Feature Guide," P/N 910-1225-01, pp. 1-208 (Jan. 1998).
Yajnik et al., "Packet loss correlation in the MBone multicast network," Computer Science Department Faculuty Publication Series, vol. 171, pp. 1-23 (1996).

(56) References Cited

OTHER PUBLICATIONS

Jalava, "Service Routing in 3GPP IP Multimedia Subsystem," Nokia, pp. 1-16 (Publication Date Unknown).

\* cited by examiner

METHODS, SYSTEMS, AND COMPUTER READABLE MEDIA FOR PROVIDING OPTIMIZED BINDING SUPPORT FUNCTION (BSF) PACKET DATA UNIT (PDU) SESSION BINDING DISCOVERY RESPONSES

TECHNICAL FIELD

The subject matter described herein relates to discovering packet data unit (PDU) session bindings More particularly, the subject matter described herein relates to methods, systems, and computer readable media for providing optimized BSF PDU session binding discovery responses.

BACKGROUND

In telecommunications networks, a service endpoint is an address on a network node that uniquely identifies an entity that provides service to service consumers. The service endpoint can include an Internet protocol (IP) address or a combination of IP address and transport layer port number, which is also referred to as an IP endpoint.

In 5G telecommunications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints. Producer NFs register with a network function repository function (NRF). The NRF maintains an NF profile of available NF instances and their supported services. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destined producer NF.

One problem with the existing 3GPP service architecture is PDU session binding information maintained in a PDU session binding database at a binding support function (BSF) may not be updated when the status of a policy control function (PCF) associated with the PDU session binding changes. For example, after a user equipment (UE) device registers with the network, the UE creates a PDU session in order to exchange data with the network. As part of the PDU session creation process, a policy control function (PCF) is assigned to the session to generate policy rules for the session to control quality of service and charging for the session. The PCF assigned to the session registers with a binding support function (BSF), and the BSF creates a binding record for the session in its database. NF service consumers seeking to discover the PDU session binding for a UE do so by querying the BSF using a discovery API provided by the BSF.

One problem that can occur when the NF service consumers query the BSF is that the PDU session binding records maintained by the BSF may not reflect the current operational status of the PCFs. For example, after a binding record is created, the operational status of a PCF associated with the binding record may change, e.g., due to the PCF going out of service. A BSF consumer NF may seek to discover a PDU session binding in order to provide service to a UE. However, if the PDU session binding information does not reflect the current operational status of the PCF, the NF may receive PDU session binding information for a PCF that is out of service. The consumer NF may then seek to contact the non-operational PCF, fail to receive a response, and then initiate discovery with a network function (NF) repository function (NRF) to obtain alternate PCF session binding information for the UE. Requiring consumer NFs to contact the BSF, contact the non-operational PCF, contact the NRF, and then contact the alternate PCF assigned to a PDU session can result in delays in providing of services to UEs.

In light of these and other challenges, there exists a need for improved, methods, and non-transitory computer-readable media for providing optimized BSF PDU session binding discovery responses.

SUMMARY

A method for providing optimized binding support function (BSF) packet data unit (PDU) session binding discovery responses is performed at a BSF including at least one processor. The method includes maintaining a database of PDU session binding records. The method further includes subscribing with a network function (NF) repository function (NRF) to receive notification of changes to NF profiles of PCF instances or NF sets identified in the PDU session binding records. The method further includes obtaining, from the NRF, lists of NF profiles for the PCF instances in the NF sets identified in the PDU session binding records. The method further includes receiving, from the NRF and in response to the subscription, at least one notification of changes in at least some of the NF profiles in the NF sets identified in the PDU session binding records. The method further includes receiving a PDU session binding discovery request from a consumer NF. The method further includes identifying, in the database of PDU session binding records and based on at least one query parameter in the PDU session binding discovery request, a matching PDU session binding record matching. The method further includes generating, using the matching PDU session binding record, one of the lists of NF profiles received from the NRF, and the at least one notification of changes in at least some of the NF profiles, a PDU session binding discovery response. The method further includes transmitting the PDU session binding response to the consumer NF.

According to another aspect of the subject matter described herein, obtaining the lists of NF profiles includes transmitting NRF discovery requests to the NRF containing attributes identifying the PCF instances or NF sets identified in the PDU session binding records.

According to another aspect of the subject matter described herein, receiving the PDU session binding discovery request includes receiving a hypertext transfer protocol (HTTP) message from a 5G consumer network function (NF) that utilizes an N5 interface to contact a PCF bound to a session.

According to another aspect of the subject matter described herein, the 5G consumer NF comprises one of an application function (AF), a network exposure function (NEF), a policy control function (PCF) and a network data analytics function (NWDAF).

According to another aspect of the subject matter described herein, receiving the PDU session binding request includes receiving a Diameter message from a Diameter node that uses an Rx interface to contact a PCF bound to a session.

According to another aspect of the subject matter described herein, the node that uses the Diameter node that uses the Rx interface comprises a Diameter relay agent (DRA).

According to another aspect of the subject matter described herein, generating the PDU session binding response includes selecting an alternate NF profile to an NF profile for a PCF instance identified in the matching PDU session binding record and including the alternate NF profile in the PDU session binding discovery response.

According to another aspect of the subject matter described herein, selecting the alternate NF profile includes filtering the one list of NF profiles based on attributes included in the matching PDU session binding record and selecting the alternate NF profile from the filtered list.

According to another aspect of the subject matter described herein, selecting the alternate NF profile includes filtering the one list of NF profiles based on operator-specified parameters and selecting the alternate NF profile from the filtered list.

According to another aspect of the subject matter described herein, the method for providing optimized BSF PDU session binding discovery responses includes updating the matching PDU session binding record based on attributes of the alternate NF profile.

According to another aspect of the subject matter described herein, A system for providing optimized binding support function (BSF) packet data unit (PDU) session binding discovery response is provided. The system includes a BSF including at least one processor and a memory. The system further includes a PDU session binding database located in the memory and including PDU session binding records. The system further includes a PCF instance tracker implemented by the at least one processor for subscribing with a network function (NF) repository function (NRF) to receive notification of changes to NF profiles of PCF instances or NF sets identified in the PDU session binding records, obtaining, from the NRF, lists of NF profiles for the PCF instances in the NF sets identified in the PDU session binding records, receiving, from the NRF and in response to the subscription, at least one notification of changes in at least some of the NF profiles in the NF sets identified in the PDU session binding records, receiving a PDU session binding discovery request from a consumer NF, and identifying, in the database of PDU session binding records and based on at least one query parameter in the PDU session binding discovery request, a matching PDU session binding record matching, generating, using the matching PDU session binding record, one of the lists of NF profiles received from the NRF, and the at least one notification of changes in at least some of the NF profiles, a PDU session binding discovery response, and transmitting the PDU session binding response to the consumer NF.

According to another aspect of the subject matter described herein, the PCF instance tracker is configured to obtain the lists of NF profiles by transmitting NRF discovery requests to the NRF containing attributes identifying the NF sets identified in the PDU session binding records.

According to another aspect of the subject matter described herein, he PCF instance tracker is configured to generate the PDU session binding response by selecting an alternate NF profile to an NF profile for a PCF instance identified in the matching PDU session binding record and including the alternate NF profile in the PDU session binding discovery response.

According to another aspect of the subject matter described herein, the PCF instance tracker is configured to select the alternate NF profile by filtering the one list of NF profiles based on at least one attributes included in the matching PDU session binding record and operator-specified parameters and selecting the alternate NF profile from the filtered list.

According to another aspect of the subject matter described herein, the PCF instance tracker is configured to update the matching PDU session binding record based on attributes of the alternate NF profile.

According to another aspect of the subject matter described herein, A non-transitory computer readable medium having stored thereon executable instructions that when executed by the processor of a computer control the computer to perform steps is provided. The steps are performed at a binding support function (BSF) including at least one processor. The steps include maintaining a database of packet data unit (PDU) session binding record. The steps further include subscribing with a network function (NF) repository function (NRF) to receive notification of changes to NF profiles of PCF instances or NF sets identified in the PDU session binding records. The steps further include obtaining, from the NRF, lists of NF profiles for the PCF instances in the NF sets identified in the PDU session binding records. The steps further include receiving, from the NRF and in response to the subscription, at least one notification of changes in at least some of the NF profiles in the NF sets identified in the PDU session binding records. The steps further include receiving a PDU session binding discovery request from a consumer NF. The steps further include identifying, in the database of PDU session binding records and based on at least one query parameter in the PDU session binding discovery request, a matching PDU session binding record matching. The steps further include generating, using the matching PDU session binding record, one of the lists of NF profiles received from the NRF, and the at least one notification of changes in at least some of the NF profiles, a PDU session binding discovery response. The steps further include transmitting the PDU session binding response to the consumer NF.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
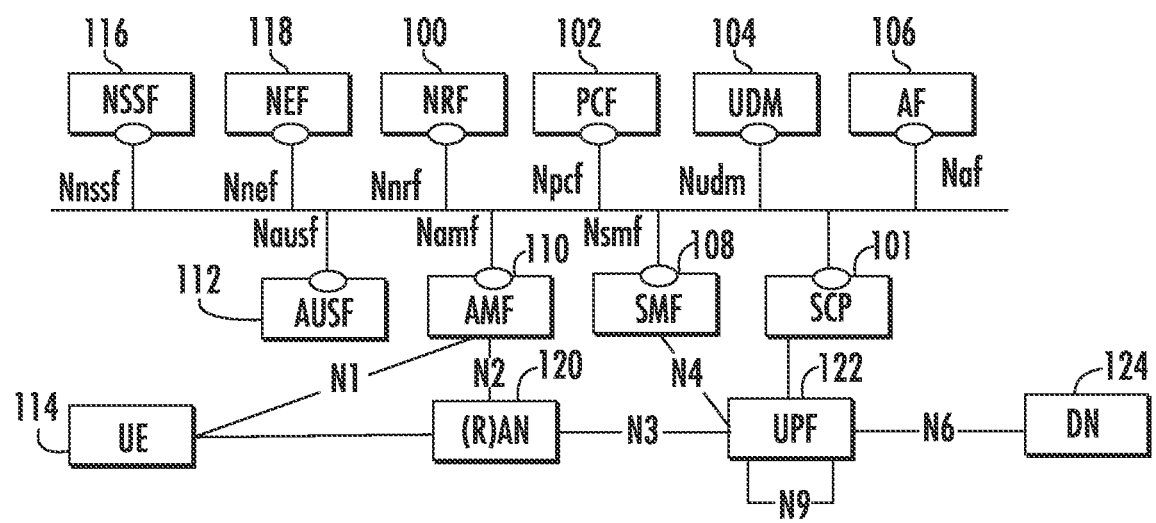
FIG. 1 is a network diagram illustrating an exemplary 5G network architecture.

The subject matter described herein relates to methods, systems, and computer readable media for providing optimized BSF PDU session binding discovery responses. FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NFs. In addition, SCP 101 may perform load balancing of connections between consumer and producer NFs.

NRF 100 is a repository for NF profiles. In order to communicate with a producer NF, a consumer NF or an SCP must obtain the NF profile from NRF 100. The NF profile is a JSON data structure defined in 3GPP TS 29.510 that stores information about NF service instances. The NF profile definition includes at least one of an FQDN, an IP version 4 address or an IP version 6 address. However, there is no requirement that the NF profile include individual IP addresses or IP endpoints associated with a producer NF service endpoint located on the producer NF service instance.

In FIG. 1, any of the nodes (other than SCP 101 and NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as UE 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1A) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Figure 2:
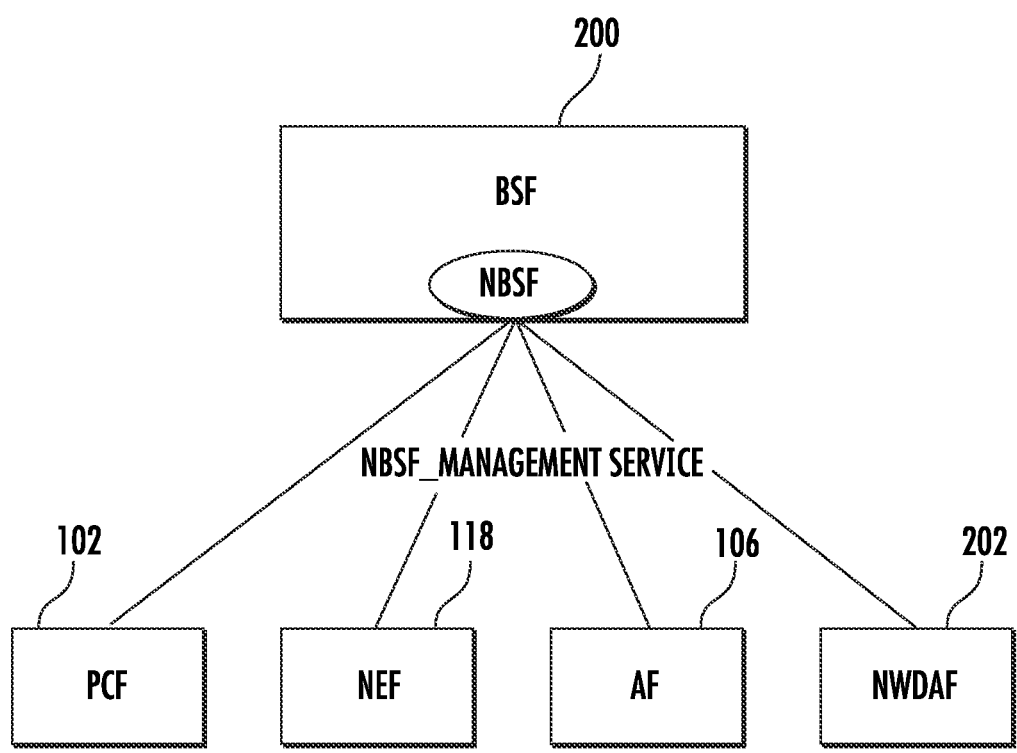
FIG. 2 is a network diagram illustrating a binding support function and nodes that communicate the binding support function.

FIG. 2 is a network diagram illustrating an additional 5G NF, the binding support function (BSF), which stores bindings between PDU sessions and PCFs and allows discovery of bindings to other nodes. In FIG. 2, BSF 200 provides a service that is referred to as the Nbsf_Management service. The Nbsf_Management service is defined in 3GPP TS 29.521.

In general, the Nbsf_Management service is used for the BSF to provide PDU session binding functionality, which ensures that an AF request for a PDU session reaches the PCF holding the PDU session information. The Nbsf_Management service allows consumers to register, update, and remove binding information. The Nbsf_Management service also allows consumers to retrieve the binding information.

In FIG. 2, the consumers of the service provided by BSF 200 include a PCF 102, NEF 118, AF 106, and network data analytics function (NWDAF) 200.

PCF 102 registers binding information in the BSF for a UE when an IPv4 address and/or an IPv6 prefix is allocated, or a MAC address is used for the PDU session. PCF 102 also updates binding information with BFS 200 when UE address information is changed for a PDU session. PCF 102 removes binding information in BSF 200 when an IPv4 address and/or an IPv6 prefix is released or a MAC address is not used for the PDU session.

NEF 118 provides a means for AF 106 to securely interact with the policy framework for policy control to a 3GPP network. During the procedure, any NEF 118 needs to discover the selected PCF using the Nbsf_Management_Discovery service operation.

AF 106 discovers the PCF using the Nbsf_Management_Discovery service operation when AF 106 is allowed to interact directly with the policy framework for policy control. NWDAF 202 discovers a selected PCF using the Nbsf_Management_Discovery service.

Table 1 shown below illustrates the operation of the Nbsf Management service.

TABLE 1

Operation of the Nbsf_management Service

| Service operation name | Description | Initiated by |
|---|---|---|
| Nbsf_Management_Register | This service operation is used to register the binding information for a UE when an IPv4 address and/or an IPv6 prefix is allocated for an IP PDU Session or a MAC address is used for an Ethernet PDU session. | NF service consumer (PCF) |
| Nbsf_Management_Deregister | This service operation is used to deregister the binding information for a UE. | NF service consumer (PCF) |
| Nbsf_Management_Discovery | This service operation is used by an NEF or AF or NWDAF to discover a selected PCF. | NF service consumer (NEF, AF, NWDAF) |
| Nbsf_Management_Update | This service operation is used to update an existing session binding information for a UE (i.e. UE address(es) for a PDU Session). | NF service consumer (PCF) |

In Table 1, the Nbsf_management services offered by the BSF include Nbsf_Management_Register service, Nbsf_Management_Deregister service, Nbsf_Management_Discovery service, and Nbsf_Management_Update service. Nbsf_Management_Register and Nbsf Management_Deregister services are services used by PCFs to register and deregister session bindings for a UE. The Nbsf_Management_Update service is used by the PCF to update a session binding for a UE when a UE address for a PDU session changes. the Nbsf_Management_Discovery service allows NF service consumers, such as NEFs, AFs, and NWDAFs, discover PDU session binding information for a UE. It is the Nbsf_Management_Discovery service that the subject matter described herein enhances by subscribing to receive updated PCF registration status information for PCFs that are bound to PDU sessions and responding to PDU session binding discovery requests with the NF profiles of reachable PCF instances.

Figure 3:
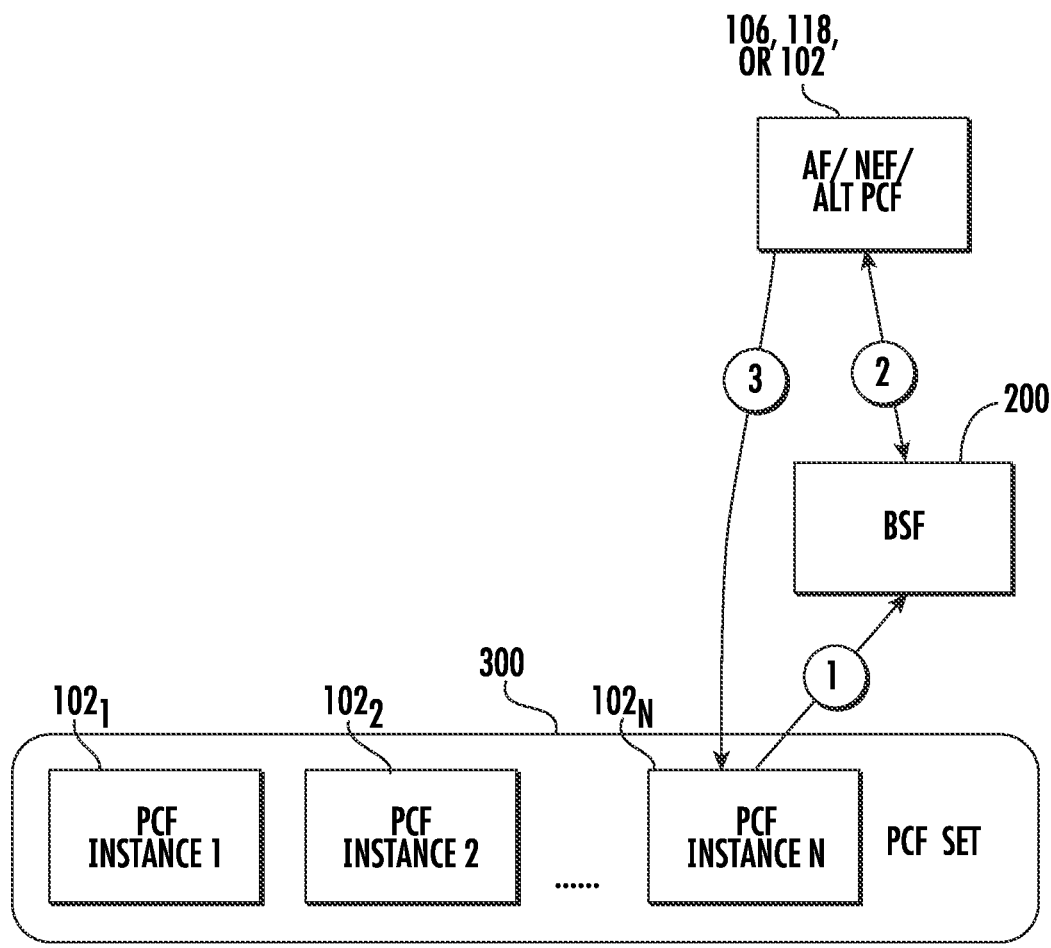
FIG. 3 is a message flow diagram illustrating exemplary messages exchanged between a BSF and consumer NFs for registration and discovery services.

FIG. 3 illustrates an exemplary message flow when a PCF registers session binding information with BSF 200 and a consumer NF discovers the session binding information for the case where the PCF registration status does not change between PDU session binding registration and discovery. Referring to FIG. 3, in step 1, a PCF instance $102_N$ creates a binding for a PDU session at BSF 200. PCF instance $102_N$ acting as the NF service consumer may provide PCF Set Id within the "pcfSetId" attribute and "bindLevel" attribute set to NF_SET or provide PCF Set Id within the "pcfSetId" attribute, PCF instance Id within the "pcfId" attribute and "bindLevel" attribute set to NF_INSTANCE. The bindLevel attribute defines the level of the PDU session binding and indicates either an individual PCF instance bound to the session or a group of PDF instances, referred to as an NF set, assigned to the PDU session. If the bindLevel attribute is set to NF_INSTANCE, a single PCF instance is assigned to the PDU session. If the bindLevel attribute is set to NF_SET, then an entire set of PCFs is bound to the PDU session. In FIG. 3, PCF set 300 includes plural PCF instances $102_1$-$102_N$, which can be bound to the same PDU session as a set. In either case, the PCF performing the registration will also specify PCF endpoint identifying parameters for the PCF instance that is providing the policy service for the session. This information will be used by BSF service consumers in discovery requests to obtain PDU session binding information.

In step 2 of FIG. 3, a consumer NF, which can be any of AF 106, NEF 118 or an alternate PCF 102, sends a BSF discovery request to obtain the details of the endpoint that can be used for N5/Rx messages. BSF 200 provides the binding information to the consumer NF 106, 118, or 102. In step 3, consumer NF 106, 118, or 102 performs N5/Rx messaging with the corresponding PCF instance.

Table 2 shown below illustrates exemplary PCF binding data that can be registered by a PCF with BSF 200.

TABLE 2

PCF Binding Data Registered by PCF with BSF

| Attribute name | Data type | P | Cardinality | Description |
|---|---|---|---|---|
| supi | Supi | O | 0..1 | Subscription Permanent Identifier |
| gpsi | Gpsi | O | 0..1 | Generic Public Subscription Identifier |
| ipv4Addr | Ipv4Addr | C | 0..1 | The IPv4 Address of the served UE. (NOTE 4) |
| ipv6Prefix | Ipv6Prefix | C | 0..1 | The IPv6 Address Prefix of the served UE. (NOTE 4) (NOTE 5) |
| addIpv6Prefixes | array (Ipv6Prefix) | O | 1..N | The additional IPv6 Address Prefixes of the served UE. (NOTE 4) (NOTE 5) |
| ipDomain | string | O | 0..1 | IPv4 address domain identifier. (NOTE 1) |
| macAddr48 | MacAddr48 | C | 0..1 | The MAC Address of the served UE. |
| addMacAddrs | array (MacAddr48) | O | 1..N | The additional MAC Addresses of the served UE. |
| dnn | Dnn | M | 1 | DNN, a full DNN with both the Network Identifier and Operator Identifier, or a DNN with the Network Identifier only. |

TABLE 2-continued

PCF Binding Data Registered by PCF with BSF

| Attribute name | Data type | P | Cardinality | Description |
|---|---|---|---|---|
| pcfFqdn | Fqdn | C | 0..1 | FQDN of the PCF hosting the Npcf_PolicyAuthorization service. (NOTE 2) |
| pcfIpEndPoints | array (IpEndPoint) | C | 1..N | IP end points of the PCF hosting the Npcf_PolicyAuthorization service. (NOTE 2) |
| pcfDiamHost | DiameterIdentity | C | 0..1 | The diameter host for an individual PCF. (NOTE 3) |
| pcfDiamRealm | DiameterIdentity | C | 0..1 | The diameter realm for an individual PCF. (NOTE 3) |
| pcfSmFqdn | Fqdn | O | 0..1 | FQDN of the PCF hosting the Npcf_SMPolicyControl service. (NOTE x) |
| pcfSmIpEndPoints | array (IpEndPoint) | O | 1..N | IP end points of the PCF hosting the Npcf_SMPolicControl service. (NOTE x) |
| snssai | Snssai | M | 1 | The identification of slice. |
| suppFeat | SupportedFeatures | O | 1 | Used to negotiate the supported optional features as described in subclause 5.8. |
| pcfId | NfInstanceId | O | 0..1 | PCF instance identifier |
| pcfSetId | NfSetId | O | 0..1 | The PCF set Id |
| recoveryTime | DateTime | O | 0..1 | Recovery time of the PCF |
| paraCom | ParameterCombination | O | 0..1 | If it is included, the BSF shall check whether there is an existing PCF binding information for the indicated combination. (NOTE 6) |
| bindLevel | BindingLevel | O | 0..1 | Contains the level of binding. |

In Table 2, in the attribute name column, the pcfFqdn, pcfIpEndPoints, pcfDiamHost, PcfDiamRealm, PcfSmlpEndPoints, the pcfId, pcfSetId, and bindLevel attributes are the PCF identifying attributes set by the PCF that creates or registers the binding record in the BSF. For a discovery request from a consumer NF that uses the N5 interface for contacting the PCF bound to a session, the pcfFqdn and pcfIpEndpoints attributes will be used by the consumer NF on the N5 interface to contact the PCF. For a discovery request from a DRA/AF that uses the Rx interface for contacting the PCF bound to a session, the PcfDiamHost and PcfDiamRealm attributes will be used by the DRA/AF to contact the PCF. In case another PCF tries to register binding of the same subscriber+dnn+snssai, pcfSmFqdn and pcfSmlpEndpoints will be used by the alternate PCF. As stated above, the PCF as the NF service consumer may provide the PCF set ID within the pcfSetId attribute and bindLevel attribute set to NF SET or provide the PCF set ID within the pcfSetId attribute, the PCF instance ID within the pcfId attribute, and the bindLevel attribute set to NF_INSTANCE. The significance of the different settings of these attributes with regarding to providing optimized PDU session binding discovery responses will be explained in detail below with regard to FIGS. 9 and 10.

Figure 4:
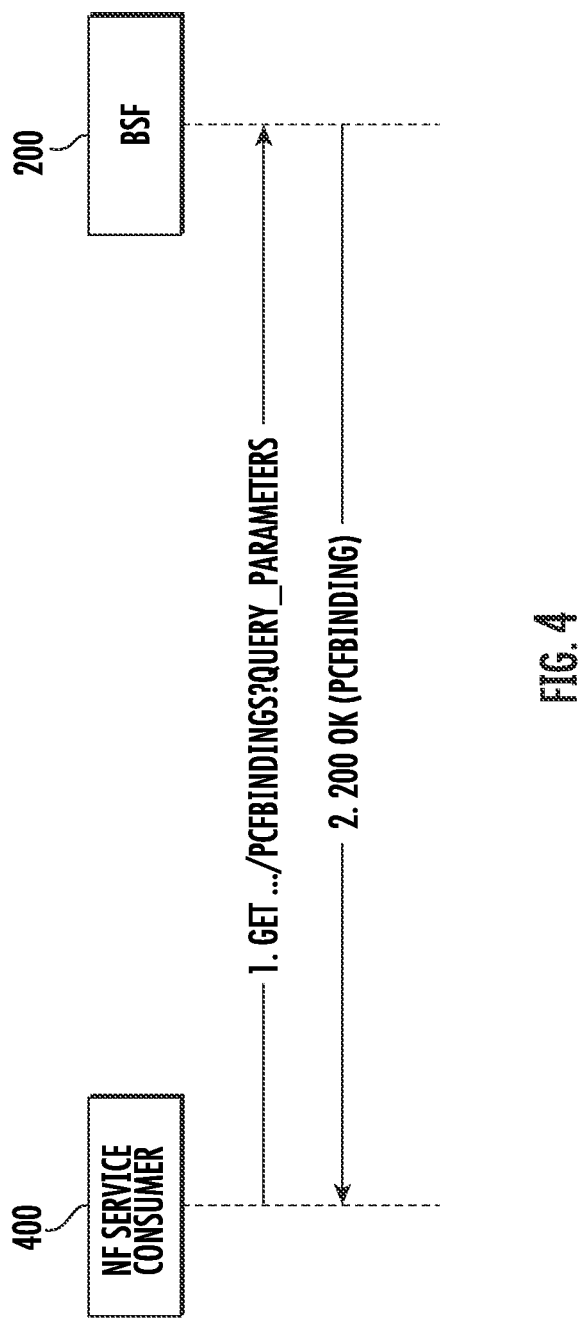
FIG. 4 is a message flow diagram illustrating exemplary messages exchanged between a BSF and an NF service consumer for PDU session binding discovery service for an NF service consumer that supports the N5 interface for policy authorization service.

FIG. 4 illustrates an exemplary message flow for the Nbsf_Management_Discovery service for a consumer NF that uses the N5 interface to contact the PCF bound to a session. Referring to FIG. 4, an NF service consumer 400, which can be any of the service consumers illustrated in FIGS. 2 and 3, invokes the Nbsf_Management_Discovery service option to obtain the address information of the selected PCF for a PDU session in the BSF (step 1). The service is invoked by sending an HTTP GET message that includes "query parameters" used by the BSF to locate any corresponding session bindings. According to 3GPP TS 29.521, the query parameters include the UE address and may include the SUPI or GPSI, DNN and optionally S-NSSAI, and IPv4 address domain. Upon receiving the HTTP GET message, BSF 200 searches for PDU session binding information that matches the query parameters. In step 3, if the HTTP request from the NF service consumer is accepted and a session binding resource matching the query parameters exists, the BSF replies with an HTTP 200 OK response with the corresponding PcfBinding data structure as provided by the PCF during the NbsfManagement_Register service operation in the response body. Table 2 above is an example of the PCFBinding data structure that will be provided to the consumer NF in response to the discovery request.

Figure 5:
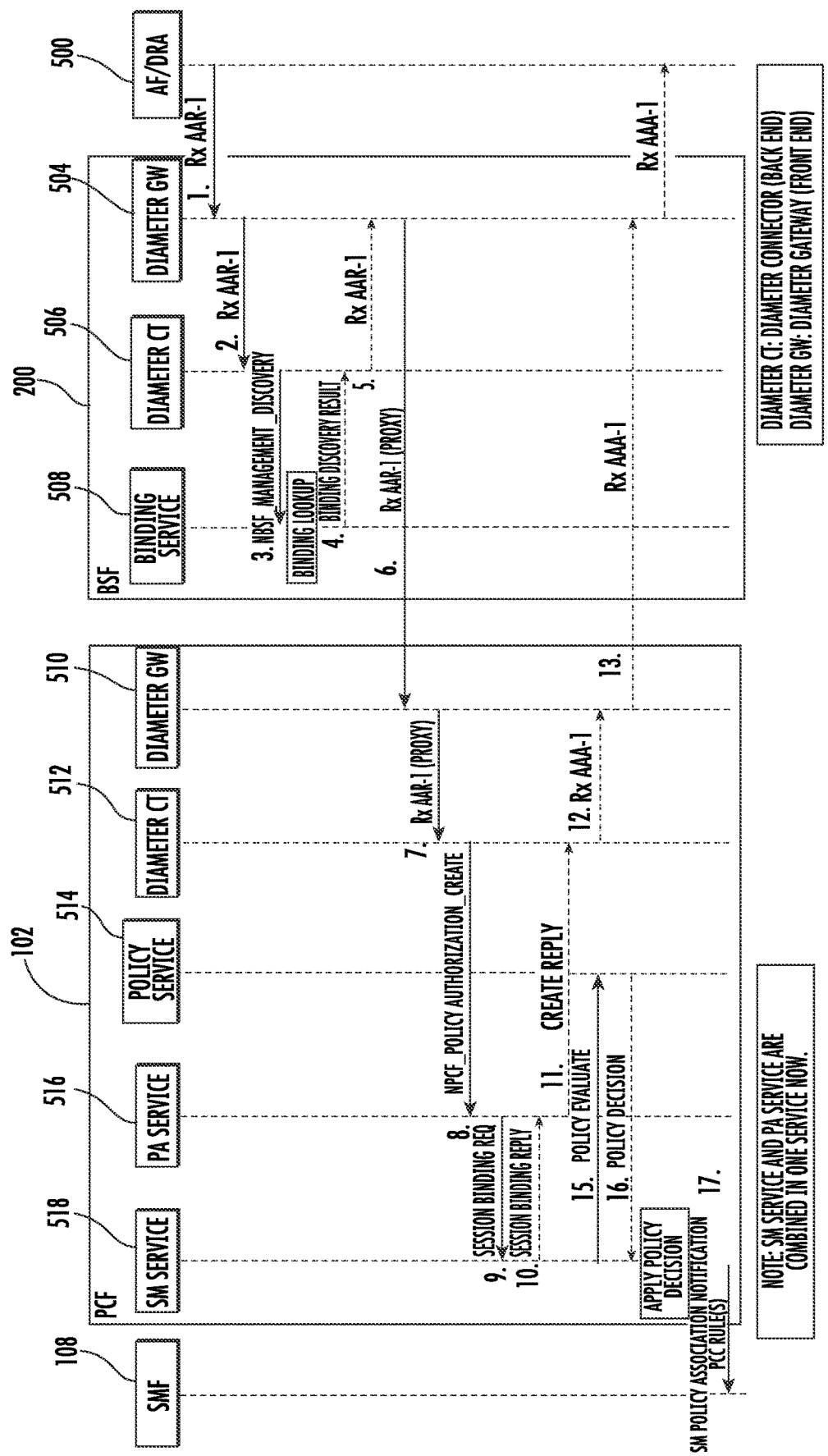
FIG. 5 is a message flow diagram illustrating exemplary messages exchanged between a BSF and a Diameter consumer NF for PDU session binding discovery service and subsequent signaling on the Rx interface between the Diameter consumer and the PCF bound to the PDU session.

FIG. 5 is a message flow diagram illustrating the PDU session binding discovery process and subsequent Rx session establishment. In FIG. 5, BSF 200 receives a discovery request which in the Diameter protocol is an Rx-AAR-I message from AF/DRA 500. BSF 200 includes a Diameter gateway 504 that receives and processes diameter messages, a Diameter connector 506 that handles diameter layer connections and a binding service 508 that implements the Nbsf_Management_Discovery service.

PCF 102 includes a Diameter gateway 510 that performs processing of received Diameter messages and a Diameter connector 512 that handles diameter connections. PCF 102 also includes a policy service 514 that makes policy decisions for PDU sessions, a policy authorization service 516 that creates policies, a session management service 518 that creates session bindings. PCF 102 interfaces with session management function 108 to inform session management function 108 of policy decisions.

In the message flow illustrated in FIG. 5, in line 1, AF/DRA 500 sends an Rx-AAR-I message to Diameter gateway 504 of BSF 200. Diameter gateway 504 receives the message and sends, in line 2, the Rx-AAR-I message to Diameter connector 506. Diameter connector 506, in response to receiving the Rx-AAR-I message, sends an Nbsf_Management_Discovery message to binding service 508. Binding service 508 performs a lookup in the binding database based on the query parameters in the Nbsf_Management_Discovery message. In line 4, binding service 508 sends the binding discovery result to Diameter connector 506. In line 5, Diameter connector 506 sends the binding results to Diameter gateway 504.

After receiving the PDU session binding information, AF/DRA 500 initiates contact on the Rx interface with the PCF assigned to the session. In line 6 of the message flow diagram, Diameter gateway 504 sends an Rx-AAR-I proxy message to Diameter gateway 510 of PCF 102. In line 7, Diameter gateway 510 sends the Rx-AAR-I proxy message to Diameter connector 512. In line 8, Diameter connector 512 sends a an Npcf_Policy_Authorization_Create message to PA service 516. In line 9, PA service 516 sends a session binding request to session management service 518. In line 10, session service 518 sends a session binding reply to PA service 516. In line 11, PA service 516 sends a create reply message to Diameter connector 512. In line 12 Diameter connector 512 sends an Rx-AAA-I message to Diameter gateway 510. In line 13, Diameter gateway 510 sends the Rx-AAA-I message to Diameter gateway 504. In line 14, Diameter gateway 504 sends the Rx-AAA-I message to AF/DRA 500.

After sending the session binding reply in line 10, SM service 518 sends a policy evaluate message to policy service 514. Policy service 514 makes a decision based on application of a policy and in line 16 sends a policy decision to SM service 518. SM service 518 applies the policy decision and in line 17 sends a policy association notification rules to SMF 108.

If the operational status of a PCF changes after a binding record is created in the BSF, many problems and inefficiencies can occur. For example, if a PCF service instance goes offline during a network outage or due to a service issue, the binding maintained by the BSF is not up to date, and an NRF discovery procedure may be required to be rerun to find an alternate PCF instance. Other problems can occur when SM, PA, and Diameter entities used to contact a PCF instance become unreachable. SMs/PA/Diameter entities published in binding information can also be changed when a new IP address, FQDN, or other identity is assigned to the PCF by the network operator. These changes make entities listed in the BSF's binding table inaccessible and, without the subject matter described herein, a manual procedure is required to update BSF binding records to correct these discrepancies.

Figure 6:
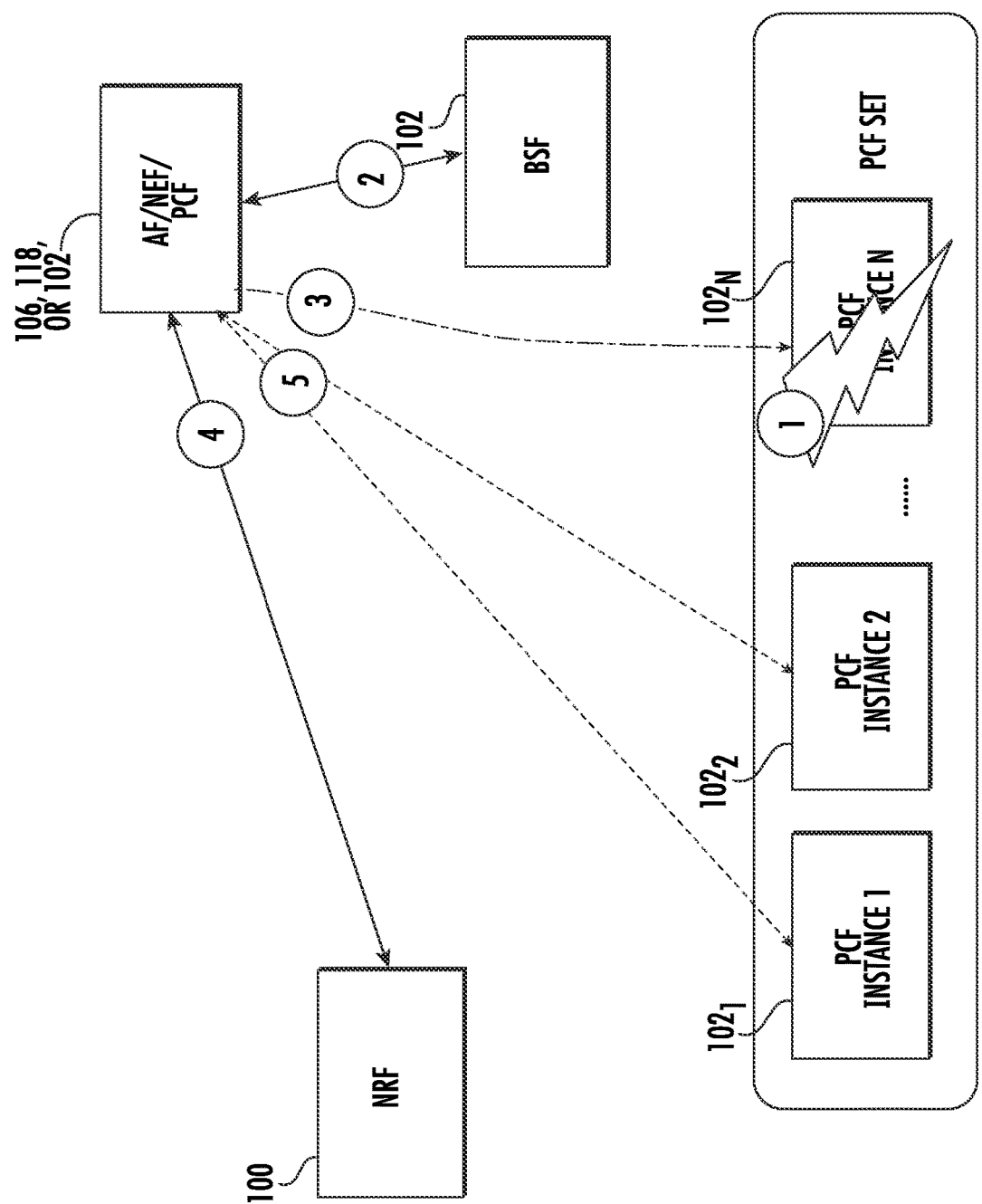
FIG. 6 is a message flow diagram illustrating exemplary messaging required to discover the identity of an alternate PCF assigned to a session when the PCF operational status changes after a PDU session binding is established.

FIG. 6 illustrates a message flow that can occur during discrepancies in the binding database maintained by BSF 200. Referring to FIG. 6, in step 1, the PCF service of PCF $102_N$ goes down. As a result, the PCF information stored in BSF 200 for PCF 102n cannot be used to process N5 or Rx messages. In step 2, AF/NEF/PCF 106, 118, or 102 attempts to perform discovery of binding information stored in the BSF. BSF 200 responds with the binding information to identify failed PCF $102_N$.

In step 3, upon receiving the discovery response, AF/NEF/PCF 106, 118, or 102 attempts to contact PCF instance $102_N$ identified in the binding response. However, PCF $102_N$ is not available. Accordingly, upon failing to receive a response, AF/NEF/PCF 106, 118 or 102 initiates the NF discovery procedure with NRF 100 to identify a new PCF instance. In step 5, consumer NF 106, 118, or 102 performs N5 or Rx message signaling with the alternate PCF instance $102_1$.

One problem caused by the unavailability of a PCF instance in the BSF binding database is a delay in processing service requests from consumer NFs. As described above, upon a failed attempt to reach the original PCF, the consumer NF initiates the NRF discovery procedure and reroutes the request to the new PCF upon receiving the discovery response from the NRF. The time required to perform discovery with the BSF, the failed attempt to contact the PCF, and to perform discovery with the NRF result in delayed service provided to the consumer NF.

Another problem associated with outdated binding information maintained by the BSF is a discovery storm at the NRF. When a PCF instance fails, all consumers of binding records with the failed PCF instance as the serving PCF instance will initiate discovery with the NRF to find the identity of an alternate PCF serving the UE. This could lead to the NRF becoming overwhelmed due to the storm of discovery messages at the NRF.

Other challenges associated with discovery include the fact that non-5G nodes, such as a Diameter relay agent (DRA) may not be able to perform 5G discovery with the NRF. Accordingly, there is no alternate route for the DRA to try when the binding information received from the BSF is incorrect or not up to date. Similarly, an AF may lack the ability to run NRF discovery to select an alternate PCF. This also limits the possibility for the AF to be served by an alternate PCF.

In order to avoid these difficulties, a BSF may subscribe with an NRF to keep track of registered PCF instances for corresponding PCF sets in the PDU session binding database maintained by the BSF. The BSF, upon processing of a bsf_discovery request, if a binding record is present in the BSF database that contains bindlevel information, may run additional logic set forth below in Table 3 to verify that reachable endpoints are in the binding discovery response.

TABLE 3

PCF Instance Tracking

| Binding level in BSF record | Criteria | Action |
|---|---|---|
| NF_INSTANCE | Corresponding pcf profile is still registered pcfFqdn/pcfIpEndPoints/ pcfDiamHost/pcfDiamRealm/ pcfSmFqdn/pcfSmIpEndPoints does not match with corresponding pcf profile | Update the attributes in binding response from corresponding PCF profile. |
| NF_SET | pcfFqdn and pcfIpEndPoints does not match with any "Registered" PCF profiles of matching setId | Select another pcf instance from corresponding pcfsetId Update the attributes in binding response from alternate PCF profile. |
| NF_SET | pcfFqdn/pcfIpEndPoints match with a PCF profiles that has matching setId but pcfDiamHost/pcfDiamRealm/ pcfSmFqdn/pcfSmIpEndPoints does not match with corresponding PCF profile | Update the attributes in binding response from matching PCF profile. |

The operation of the BSF in the various scenarios illustrated in Table 3 will be described in detail below.

Figure 7:
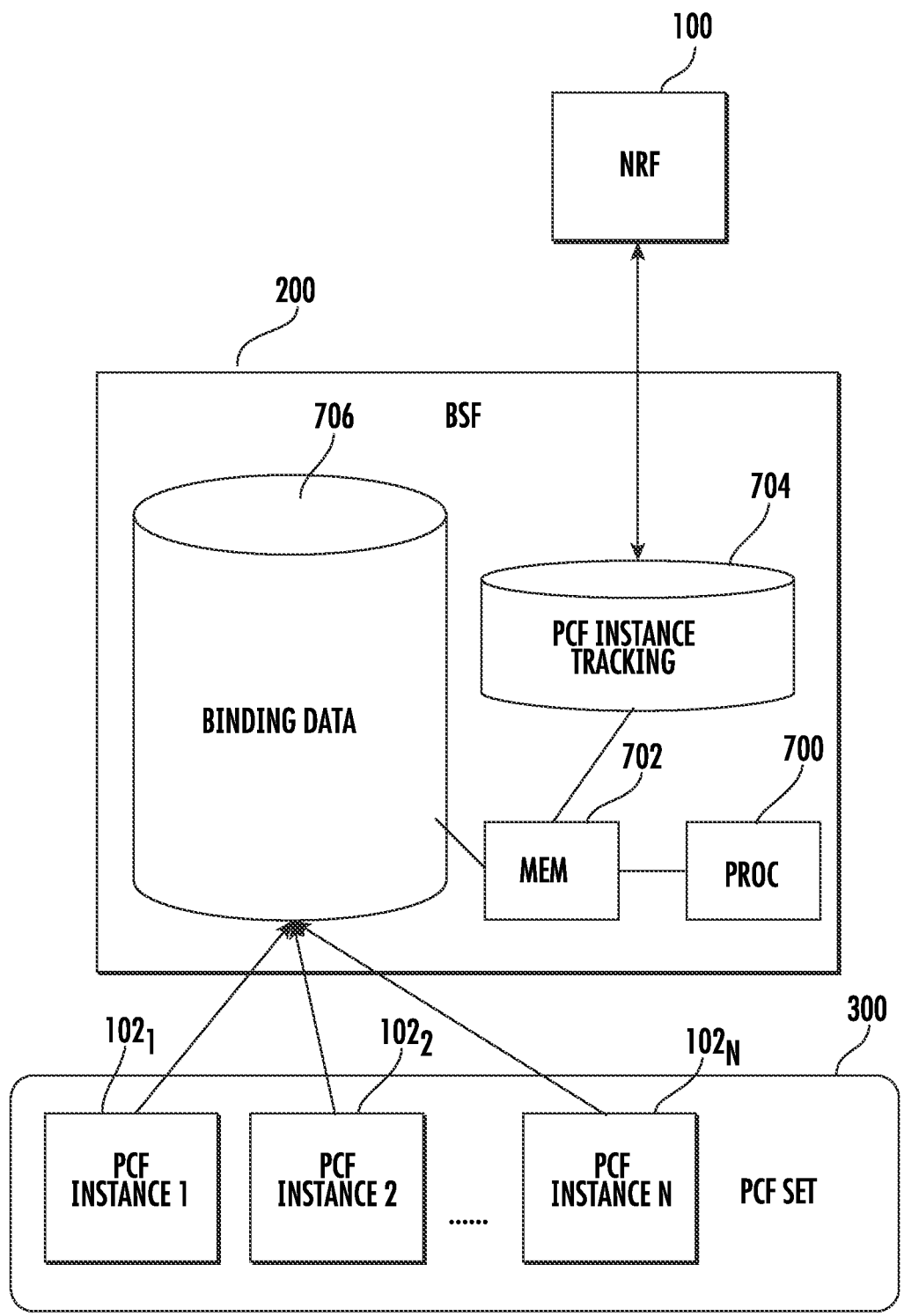
FIG. 7 is a block diagram illustrating a BSF with PCF instance tracking for maintaining operational status information for PCF instances for which PDU session binding is present in a PDU session binding database.

FIG. 7 illustrates an overview of this solution. In FIG. 7, BSF 200 includes at least one processor 700 and memory 702. BSF 200 further includes a PCF instance tracker 704 that may be implemented in software executable by processor 700. PCF instance tracker 704 subscribes with NRF 100 to obtain up to date registration status and NF profile information for PCF instances whose binding data is stored in binding database 706 and generate optimized BSF PDU session binding discovery responses based on the updated registration status and NF profile information.

Figure 8:
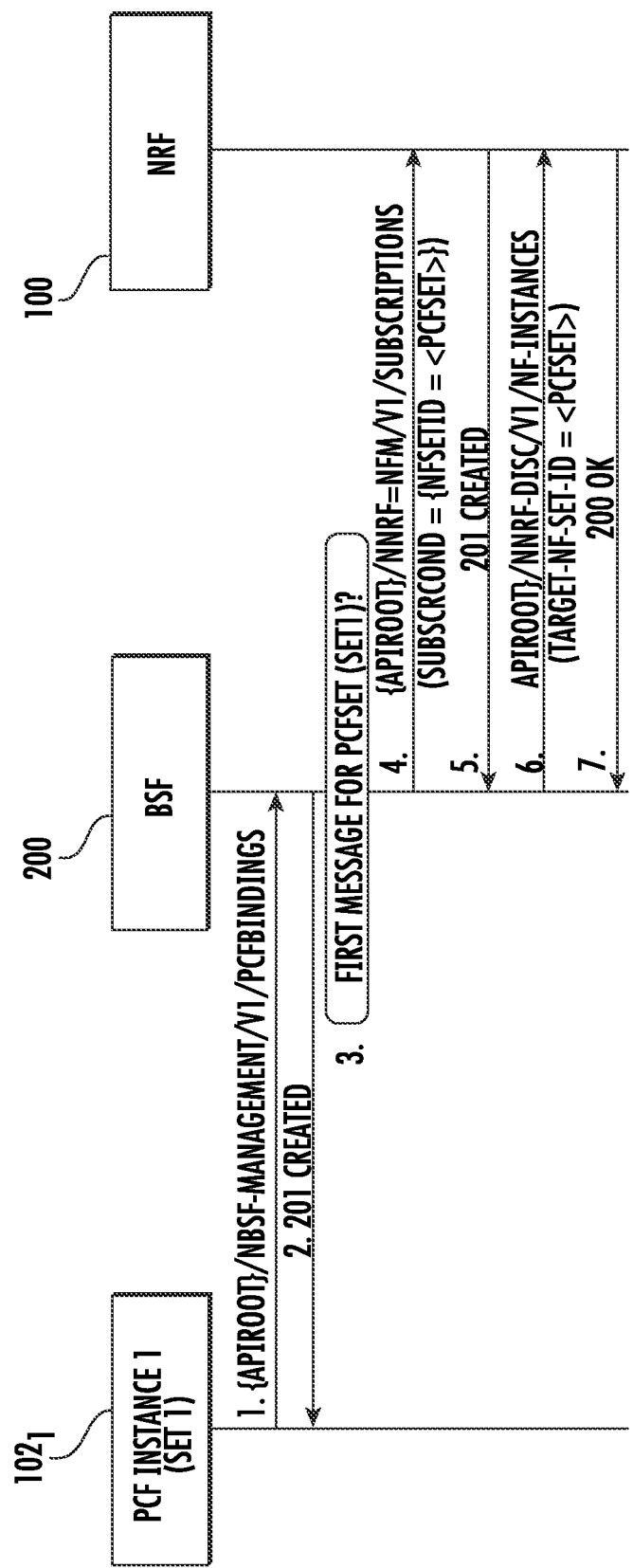
FIG. 8 is a message flow diagram illustrating exemplary messages exchanged between a PCF instance, the BSF, and an NRF when the BSF implements PCF instance tracking.

FIG. 8 illustrates exemplary messaging exchanged between BSF 200, PCF instance 102₁, and NRF 100 associated with tracking registered PCF instances. As part of the solution, BSF 200 keeps tracks of registered PCF instances for corresponding "pcfset(s)". For example, when any PCF instance from PCF NF set "set 1" creates a first binding, BSF 200 subscribes with NRF 100 to monitor all PCF instances that register with NRF 100 with the pcf set id "set1". BSF 200 also tracks the number of stored binding records for a given PCF NF set id. When a counter for given NF set id goes to 0, BSF 200 un-subscribes for that NFSet with NRF 100.

Referring to the message flow in FIG. 8, in line 1, PCF instance 102₁ of PCF set set1 sends a registration message to BSF 200 to create a PDU session binding between PCF instance 102₁ and a PDU session. In line 2, BSF 200 creates the session binding, creates a corresponding record in the PDU session binding database, and responds to PCF instance 102₁ with an HTTP 201 message indicating that the binding has been created. In line, BSF 200 determines whether the registration message received in line 1 is the first message received for the PCF set set1. In this example, BSF 200 determines that registration message is the first message received for pcfSet set1. Accordingly, in line 4 of the message flow diagram, BSF 200 subscribes with NRF 100 to receive notification of change in status of NF instances in the NF set set1. In line 5 of the message flow diagram, NRF 100 processes the subscription request for pcfSet set1, creates the subscription, and responds to BSF 200 indicating the subscription has been created. Once the subscription is created, BSF 200 will receive notice from NRF 100 any time a change in status of the of any of the NF instances in set1 occurs until the timer maintained by BSF 200 for the subscription expires and BSF 200 unsubscribes with NRF 100 for the status of the PCF set. In line 6 of the message flow diagram, BSF 200 invokes the nnrf discovery service to discover the PCF profiles in the nfSet set1. In line 7, NRF 100 responds with a 200 Ok message that includes the list NF profiles of the PCFs in set1. After a successful subscription, the NRF notifies changes to subscribed data from the point of subscription only. Thus, line 6 is required for the BSF to fetch the list of all PCF instances in NFSet, with their current states at NRF.

After the message flow in FIG. 8, BSF 200 will have a list of NF profiles for the PCFs in set 1 and will be subscribed with the NRF to receive updates in status of the PCFs. The NRF will notify the BSF any time the NF profile of any of the PCFs in set1 changes. Examples of changes in status include deregistration, change in IP address, etc. As will be described in detail below, BSF 200 will use this information to provide optimized discovery response to consumer NFs seeking to discover PDU session binging information from BSF 200.

Figure 9:
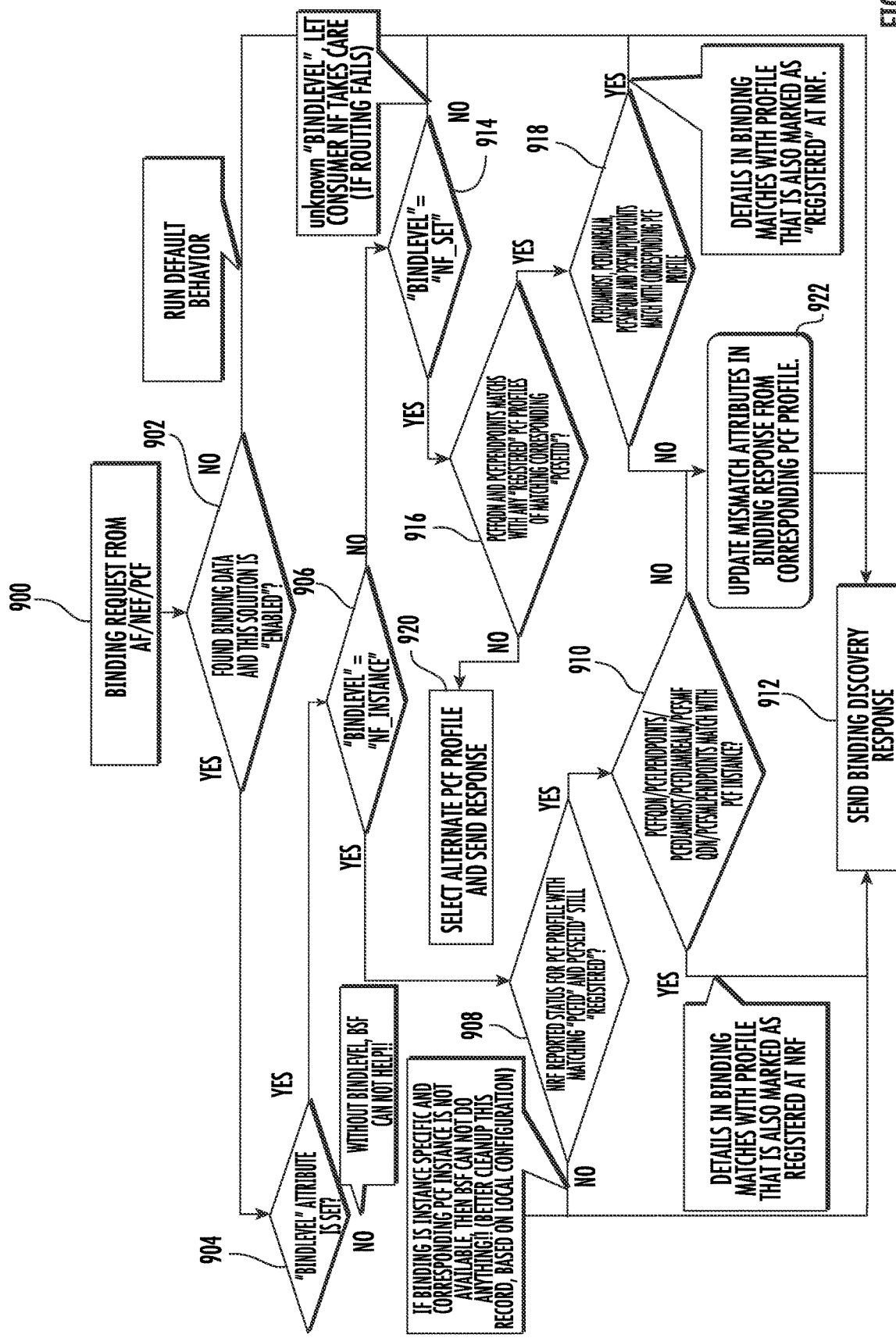
FIG. 9 is a flow chart illustrating exemplary steps performed by the BSF for PCF instance tracking and providing optimized PDU session binding discovery responses to consumer NFs.

FIG. 9 is a flow chart illustrating an exemplary process performed by BSF 200 in processing a PDU session binding discovery request message from a consumer NF. Referring to FIG. 9, in step 900, BSF 200 receives a binding discovery request from a consumer NF. The consumer NF may be an AF, an NEF, another PCF, or an NWDAF. In step 902, BSF 200 determines whether binding data is present in the binding database and whether this solution for maintaining PCF status information is enabled. If the solution is enabled, control proceeds to step 904, where BSF 200 determines whether the bind level attribute is set in the binding record in the record in the PDU session binding database containing the binding data requested by the discovery request. As illustrated in Table 2, the bind level attribute defines the level at which the binding was originally created. If the binding level attribute is set, control proceeds to step 906 where BSF 200 determines whether the bind level is NF_instance.

If the bind level is set to NF_instance, this indicates that the binding level for the record is and individual PCF instance, and control proceeds to step 908 where BSF 200 checks the NRF reported status for the PCF profile with the same pcfId indicates that the corresponding PCF is still registered with the NRF. If the PCF is still registered, control proceeds to step 910 where BSF 200 determines whether the parameters stored for the PCF instance in the binding record match the corresponding details in the NF profile registered for the PCF instance with the NRF. If the parameters match, control proceeds to step 912 where BSF 200 sends a binding discover response with the PCF instance profile of the PCF matching the query parameters (such as UE address) in the binding discovery request.

Returning to step 910, if pcfDiamHost, pcfDiam Realm, pcfSmlpEndPoints, or pcfSmFqdn stored for the PCF instance in the binding record does not match the corresponding details in the NF profile registered for the PCF instance with the NRF, then the parameters in discovery response need to be updated with the parameters for the matching PCF profile registered with the NRF. Accordingly, control proceeds to step 922 where the mismatching attributes are updated in the binding response and the response is sent to the consumer NF.

Returning to step 902, if there is no binding data and/or the solution is not enabled, default behavior is executed and control proceeds to step 912 where the binding discovery response is sent. If there is no binding data, the binding discovery response will indicate that there is no binding data stored with the BSF matching the query parameters in the binding discovery request.

Returning to step 904, if the bind level attribute is not set in the binding discovery request, the BSF cannot verify PCF instance details from binding data, with registered PCF profiles at NRF. Thus, control proceeds to step 912, where the binding discovery response with PCF information as stored in binding database is sent.

Returning to step 906, if the bind level in the binding data is not set to NF_Instance, control proceeds to step 914, where is determined whether the bind level is set to NF_Set. If the bind level is set to NF_Set, control proceeds to step 916 where the BSF 200 determines whether the pcfFqdn and pcfIpEndPoints parameters in the binding record match those for any PCF profile registered with the NRF (received by the BSF in the discovery response and as modified by any status notifications received from the BSF) for the pcfSetId in the binding record. If the parameters match those for any PCF profile registered with the NRF, control proceeds to step 918 where BSF 200 determines whether the PCF pcfDiamHost, pcfDiamRealm, pcfSmFqdn, pcfSmlpEndpoints parameters match those for the corresponding PCF profile identified as matching in step 916. If the parameters in step 918 match, this indicates that the PCF profile registered with the NRF matches the details in the binding record, and, control proceeds to step 912 where the binding discovery response with the PCF profile is sent to the consumer NF.

Returning to step 908, if the bind level is set to NF_Instance and the NRF reported status information for the PCF profile matching the pcfId and pcfSetId is no longer registered with the NRF, the BSF cannot provide the PDU session binding information to the service consumer. In this case, the BSF may respond to the service consumer indicating that no binding information is available and perform actions to clean up or delete the corresponding binding record. Without the solution described herein, the BSF would have responded to the discovery request with a PCF profile of a PCF that is no longer registered with the NRF. This would result in the inefficiencies described above where the service consumer attempts to contact the PCF, is unsuccessful, and contacts the NRF to obtain updated binding information for the PDU session.

Returning to step 914, if the bindLevel is not set to NF_Set or NF_Instance, the bindLevel is unknown because these are the only two allowed bindLevels allowed by the 3GPP specifications. Accordingly, control proceeds to step 912 where BSF 200 sends a binding discovery response to the consumer NF indicating with PCF and binding information as stored in binding database is sent Returning to step 916, if the pcfFqdn and pcfIpEndpoints in the binding record matching the query parameters do not match any of the PCF profiles registered with the NRF, control proceeds to step 920 where BSF 200 selects an alternate PCF profile and sends a discovery response to the consumer NF with the alternate PCF profile. Details of the steps performed by BSF 200 to select the alternate PCF profile are described below with regard to FIG. 10.

Returning to step 918, if the pcfFqdn and pcfIpEndpoints in the binding record matching the query parameters match one of the PCF profiles registered but the pcfDiam Host, pcfDiamRealm, pcfSmlpEndPoints, or pcfSmFqdn does not match the corresponding PCF profile, then the parameters in discovery response need to be updated with the parameters for the matching PCF profile registered with the NRF. Accordingly, control proceeds to step 922 where the mismatching attributes are updated in the binding response and the response is sent to the consumer NF.

Figure 10:
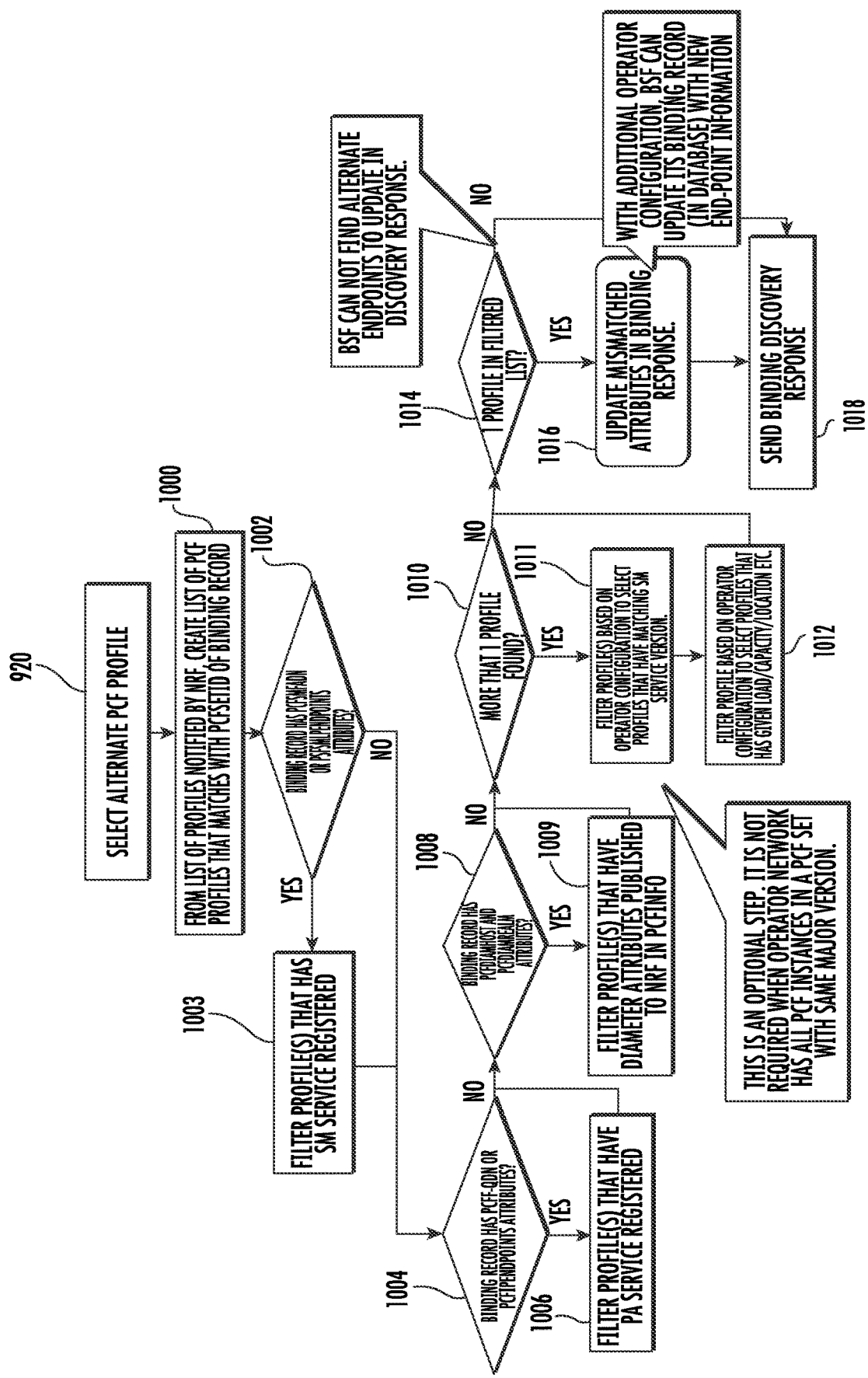
FIG. 10 is a flow chart illustrating exemplary steps performed by the BSF for selecting an alternate PCF profile to provide in a PDU session binding discovery response when the operational status of a PCF changes.

FIG. 10 illustrates exemplary steps for selecting an alternate PCF profile as illustrated by step 920 in FIG. 9. Referring to FIG. 10, selecting an alternate PCF profile begins in step 1000 where BSF 200 creates, from the list of PCF profiles received from the NRF in the discovery response from the NRF to the BSF (see step 7 in FIG. 8) or later through NRF notification due to change in status of PCF profile(s) for subscriber NfSet, a list of PCF profiles that match the pcfSetId of the binding record. In step 1002, BSF 200 determines whether the binding record has pcfSmFqdn or pcfSmlpEndPoints attributes. If BSF 200 determines that the binding record has pcfSmFqdn or pcfSmlpEndPoints attributes, control proceeds to step 1003 where BSF 200 filters the profile to locate a profile that supports at least one instance of session management service. If in step 1002 BSF 200 determines that the binding record does not have pcfSmFqdn or pcfSmlpEndPoints attributes, step 1003 is bypassed.

After step 1000 or 1003, control then proceeds to step 1004 where BSF 200 determines whether the binding record has pcfFqdn or pcfIpEndPoints attributes. If the binding record includes these attributes, control proceeds to step 1006 where BSF 200 filters the profiles that have PA service registered. If the binding record does not include the pcfFqdn or pcfIpEndpoints attributes, step 1006 is bypassed.

After step 1004 or 1006, control proceeds to step 1008, where BSF 200 determines whether the binding record has pcfDiamHost and pcfDiamRealm attributes. If the binding record has pcfDiam Host and pcfDiam Realm attributes, control proceeds to step 1009 where BSF 200 filters profiles that have Diameter attributes published to the NRF in pcfinfo. If the binding record does not have pcfDiamHost and pcfDiam Realm attributes, step 1009 is bypassed.

After the filtering in step 1009 or if the binding record does not have the pcfDiamHost and pcfDiamRealm attributes in step 1008, control then proceeds to step 1010 where BSF 200 determines whether the list, after the filtering, has more than one profile. If the filtered list includes more than one profile, control proceeds to step 1011 where BSF 200 filters the profile based on operator configuration to select profiles to select a profile that has a matching SM service version. This is an optional step. It is not required when the operator network has more than one PCF instance in the same PCF set with the same major version. Control then proceeds to step 1012 where BSF 200 filters the profile based on operator configuration to select profiles that have the specific api version, load, capacity, location, etc. that best satisfies the requirements of the network operator to be selected as an alternate PCF profile for the PCF whose status has changed since the binding record was created. If in step 1010, the BSF determines that the list does not include more than one profile, steps 1011 and 1012 are bypassed.

After the filtering in step 1012 or if more than 1 profile was not found in step 1010, control proceeds to step 1014 where BSF 200 determines whether there is at least one profile in the filtered list. If BSF 200 determines that there is at least one profile in the filtered list, control proceeds to step 1016 where BSF 200 updates the binding discovery response to be sent to the consumer NF to match the parameters of the alternate PCF profile. BSF 200 may optionally update the binding record in the PDU session binding database to include the updated information for the alternate PCF. In step 1018, BSF 200 sends the discovery response with the alternate PCF binding information to the consumer NF.

If BSF 200 determines in step 1014 that there are no remaining profiles in the list, this means that BSF 200 cannot find an alternate PCF profile to include in the binding discovery response. Accordingly, control proceeds to step 1018 where the binding discovery response is sent with the PCF profile from the PDU session binding record.

Thus, the solution described herein allows BSF to actively monitor PCF status information by subscribing to and receiving updates from an NRF. If a PCF whose binding information is maintained at the BSF fails, goes out of service, or has changed attributes in its NF profile, the BSF will upon receiving a discovery request, update the information to be provided to the consumer NF in a binding discovery response and provide the updated binding information to the requesting consumer NF. The BSF may optionally update the binding information for the UE in the PDU session binding database. Such a solution reduces additional messaging from consumer NFs, such as AFs, NEFs, and PCFs towards the NRF. It provides efficient network utilization but avoids network overload. Higher throughput and lower latency at the AF, NEF, and PCF can also be achieved by avoiding unnecessary NRF discovery.

The subject matter described herein is optional and backward compatible. It does not require any parameter or trigger from any other NF and thus control and scope of the feature can be implemented at the BSF. The feature can be selectively enabled for specific consumers by network operators. Information about a consumer seeking force to perform selective enablement can provide selection details such as an instance ID or PLMN ID in authorization token. Alternatively, for HTTPS connections, the transport layer security (TLS) certificate can be used to find the identity of the consumer. Similarly, Vendor specific attributes in the discovery request can also be used to identify the consumer.

The disclosure of each of the following references is hereby incorporated herein by reference in its entirety.

REFERENCES 1. 3GPP TS 29.521; 3$^{rd}$ Generation Partnership Project; Technical Specification Group Core Network and Terminals; 5G System; Binding Support Management Service; Stage 3 (Release 16), V16.5.0 (2020-09).
2. 3GPP TS 29.510; 3$^{rd}$ Generation Partnership Project; Technical Specification Group Core Network and Terminals; 5G System; Network Function Repository Services; Stage 3 (Release 16), V16.5.0 (2020-09). It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing optimized binding support function (BSF) packet data unit (PDU) session binding discovery responses, the method comprising:
   at a BSF including at least one processor:
      maintaining a database of packet data unit (PDU) session binding records;
      subscribing with a network function (NF) repository function (NRF) to receive notification of changes to NF profiles of policy control function (PCF) instances or NF sets identified in the PDU session binding records;
      obtaining, from the NRF, lists of NF profiles for the PCF instances in the NF sets identified in the PDU session binding records;
      receiving, from the NRF and in response to the subscription, at least one notification of changes in at least some of the NF profiles in the NF sets identified in the PDU session binding records;
      receiving a PDU session binding discovery request from a consumer NF;
      identifying, in the database of PDU session binding records and based on at least one query parameter in the PDU session binding discovery request, a matching PDU session binding record matching;
      generating, using the matching PDU session binding record, one of the lists of NF profiles received from the NRF, and at least one notification of changes in at least some of the NF profiles, a PDU session binding discovery response; and
      transmitting the PDU session binding response to the consumer NF.

2. The method of claim 1 wherein obtaining the lists of NF profiles includes transmitting NRF discovery requests to the NRF containing attributes identifying the NF sets identified in the PDU session binding records.

3. The method of claim 1 wherein receiving the PDU session binding discovery request includes receiving a hypertext transfer protocol (HTTP) message from a 5G consumer network function (NF) that utilizes an N5 interface to contact a PCF bound to a session.

4. The method of claim 3 wherein the 5G consumer NF comprises one of an application function (AF), a network exposure function (NEF), a policy control function (PCF) and a network data analytics function (NWDAF).

5. The method of claim 1 wherein receiving the PDU session binding request includes receiving a Diameter message from a Diameter node that uses an Rx interface to contact a PCF bound to a session.

6. The method of claim 5 wherein the node that uses the Diameter node that uses the Rx interface comprises a Diameter relay agent (DRA) or Diameter based application server.

7. The method of claim 1 wherein generating the PDU session binding response includes selecting an alternate NF profile to an NF profile for a PCF instance identified in the matching PDU session binding record and including the alternate NF profile in the PDU session binding discovery response.

8. The method of claim 7 wherein selecting the alternate NF profile includes filtering the one list of NF profiles based on attributes included in the matching PDU session binding record and selecting the alternate NF profile from the filtered list.

9. The method of claim 7 wherein selecting the alternate NF profile includes filtering the one list of NF profiles based on operator-specified parameters and selecting the alternate NF profile from the filtered list.

10. The method of claim 7 comprising updating the matching PDU session binding record based on attributes of the alternate NF profile.

11. A system for providing optimized binding support function (BSF) packet data unit (PDU) session binding discovery responses, the system comprising:
    a BSF including at least one processor and a memory;
    a PDU session binding database located in the memory and including PDU session binding records;
    a policy control function (PCF) instance tracker implemented by the at least one processor for subscribing with a network function (NF) repository function (NRF) to receive notification of changes to NF profiles of PCF instances or NF sets identified in the PDU session binding records, obtaining, from the NRF, lists of NF profiles for the PCF instances in the NF sets identified in the PDU session binding records, receiving, from the NRF and in response to the subscription, at least one notification of changes in at least some of the NF profiles in the NF sets identified in the PDU session binding records, receiving a PDU session binding discovery request from a consumer NF, and identifying, in the database of PDU session binding records and based on at least one query parameter in the PDU session binding discovery request, a matching PDU session binding record matching, generating, using the matching PDU session binding record, one of the lists of NF profiles received from the NRF, and the at least one notification of changes in at least some of the NF profiles, a PDU session binding discovery response, and transmitting the PDU session binding response to the consumer NF.

12. The system of claim 11 wherein the PCF instance tracker is configured to obtain the lists of NF profiles by transmitting NRF discovery requests to the NRF containing attributes identifying the NF sets identified in the PDU session binding records.

13. The system of claim 11 wherein the PDU session binding discovery request comprises a hypertext transfer protocol (HTTP) message from a 5G consumer network function (NF) that utilizes an N5 interface to contact a PCF bound to a session.

14. The system of claim 13 wherein the 5G consumer NF comprises one of an application function (AF), a network exposure function (NEF), a policy control function (PCF) and a network data analytics function (NWDAF).

15. The system of claim 11 wherein the PDU session binding comprises a Diameter message from a Diameter node that uses an Rx interface to contact a PCF bound to a session.

16. The system of claim 15 wherein the node that uses the Diameter node that uses the Rx interface comprises a Diameter relay agent (DRA).

17. The system of claim 11 wherein the PCF instance tracker is configured to generate the PDU session binding response by selecting an alternate NF profile to an NF profile for a PCF instance identified in the matching PDU session binding record and including the alternate NF profile in the PDU session binding discovery response.

18. The system of claim 17 wherein the PCF instance tracker is configured to select the alternate NF profile by filtering the one list of NF profiles based on at least one attributes included in the matching PDU session binding record and operator-specified parameters and selecting the alternate NF profile from the filtered list.

19. The system of claim 17 wherein the PCF instance tacker is configured to update the matching PDU session binding record based on attributes of the alternate NF profile.

20. A non-transitory computer readable medium having stored thereon executable instructions that when executed by a processor of a computer control the computer to perform steps comprising:

at a binding support function (BSF) including at least one processor:

maintaining a database of packet data unit (PDU) session binding records;

subscribing with a network function (NF) repository function (NRF) to receive notification of changes to NF profiles of policy control function (PCF) instances or NF sets identified in the PDU session binding records;

obtaining, from the NRF, lists of NF profiles for the PCF instances in the NF sets identified in the PDU session binding records;

receiving, from the NRF and in response to the subscription, at least one notification of changes in at least some of the NF profiles in the NF sets identified in the PDU session binding records;

receiving a PDU session binding discovery request from a consumer NF;

identifying, in the database of PDU session binding records and based on at least one query parameter in the PDU session binding discovery request, a matching PDU session binding record matching;

generating, using the matching PDU session binding record, one of the lists of NF profiles received from the NRF, and the at least one notification of changes in at least some of the NF profiles, a PDU session binding discovery response; and transmitting the PDU session binding response to the consumer NF.

* * * * *

UNITED STATES PATENT AND TRADEMARK OFFICE
CERTIFICATE OF CORRECTION

PATENT NO. : 11,283,883 B1
APPLICATION NO. : 17/093016
DATED : March 22, 2022
INVENTOR(S) : Krishan et al.

It is certified that error appears in the above-identified patent and that said Letters Patent is hereby corrected as shown below:

On the Title Page

Column 2, Item (57) under Abstract, Line 2, delete "maintain" and insert -- maintaining --, therefor.

On page 2, Column 1, Item (56) under U.S. PATENT DOCUMENTS, Line 3, delete "6,928,383" and insert -- 6,298,383 --, therefor.

On page 2, Column 2, Item (56) under U.S. PATENT DOCUMENTS, Line 29, delete "2009/0022131" and insert -- 2009/0221310 --, therefor.

On page 4, Column 2, Item (56) under Other Publications, Line 38, delete "Appication" and insert -- Application --, therefor.

On page 4, Column 2, Item (56) under Other Publications, Line 48, delete "Applicaton" and insert -- Application --, therefor.

On page 6, Column 1, Item (56) under Other Publications, Line 49, delete "Transmital" and insert -- Transmittal --, therefor.

On page 7, Column 1, Item (56) under Other Publications, Line 33, delete "Requirment" and insert -- Requirement --, therefor.

On page 7, Column 2, Item (56) under Other Publications, Line 43, delete "(Dowloaded" and insert -- (Downloaded --, therefor.

On page 7, Column 2, Item (56) under Other Publications, Line 70, delete "Faculuty" and insert -- Faculty --, therefor.

Signed and Sealed this
Sixteenth Day of August, 2022

Katherine Kelly Vidal
*Director of the United States Patent and Trademark Office*

CERTIFICATE OF CORRECTION (continued)
U.S. Pat. No. 11,283,883 B1

In the Specification

In Column 11, Line 10, delete "a an" and insert -- a --, therefor.

In Column 13, Line 36, delete "of the of" and insert -- of the --, therefor.

In Column 15, Line 19, delete "sent" and insert -- sent. --, therefor.

In the Claims

In Column 19, Line 21, in Claim 19, delete "tacker" and insert -- tracker --, therefor.